US011139978B2

(12) United States Patent
Leong et al.

(10) Patent No.: US 11,139,978 B2
(45) Date of Patent: Oct. 5, 2021

(54) PORTABLE BIOMETRIC IDENTITY ON A DISTRIBUTED DATA STORAGE LAYER

(71) Applicant: Accenture Global Solutions Limited, Dublin (IE)

(72) Inventors: Christine Chit Wah Leong, Houston, TX (US); David Baurle Treat, Ridgefield, CT (US); Daniel Bachenheimer, Silver Spring, MD (US); Giuseppe Giordano, Juan-les-Pins (FR); Jaroslav Saxa, Bratislava (SK)

(73) Assignee: Accenture Global Solutions Limited, Dublin (IE)

( * ) Notice: Subject to any disclaimer, the term of this patent is extended or adjusted under 35 U.S.C. 154(b) by 310 days.

(21) Appl. No.: 16/008,717

(22) Filed: Jun. 14, 2018

(65) Prior Publication Data

US 2018/0367310 A1    Dec. 20, 2018

(30) Foreign Application Priority Data

Jun. 15, 2017 (EP) .................................. 17305735
Aug. 23, 2017 (EP) .................................. 17306091

(51) Int. Cl.
| | |
|---|---|
| *H04L 9/32* | (2006.01) |
| *G06K 9/00* | (2006.01) |
| *H04L 9/08* | (2006.01) |
| *H04L 29/06* | (2006.01) |
| *H04L 29/08* | (2006.01) |
| *G06F 16/84* | (2019.01) |

(52) U.S. Cl.
CPC ............ *H04L 9/3231* (2013.01); *G06F 16/84* (2019.01); *G06K 9/00926* (2013.01); *H04L 9/0861* (2013.01); *H04L 9/3213* (2013.01); *H04L 9/3239* (2013.01); *H04L 9/3247* (2013.01); *H04L 63/102* (2013.01); *H04L 67/10* (2013.01); *H04L 2209/38* (2013.01)

(58) Field of Classification Search
CPC ... H04L 9/3231; H04L 9/3239; H04L 9/3213; H04L 9/0861; H04L 63/102; H04L 67/10; H04L 9/3247; H04L 2209/38; G06F 16/84; G06K 9/00926
See application file for complete search history.

(56) References Cited

U.S. PATENT DOCUMENTS

| | | | | |
|---|---|---|---|---|
| 8,904,525 | B1* | 12/2014 | Hodgman .............. | G06F 21/567 726/22 |
| 2003/0225693 | A1* | 12/2003 | Ballard ................ | G06F 21/6245 705/42 |
| 2005/0165784 | A1* | 7/2005 | Gomez ................. | G06F 16/951 |

(Continued)

OTHER PUBLICATIONS

IP.com Search Query Jul. 31, 2020 (Year: 2020).*

*Primary Examiner* — Samson B Lemma
*Assistant Examiner* — Blake I Narramore
(74) *Attorney, Agent, or Firm* — Crowell & Moring LLP

(57) ABSTRACT

A distributed data storage layer supports biometric identification systems. The biometric identity system includes hardware and software improvements for capturing, retrieving, and verifying identity based on securely stored biometric data in the distributed data storage layer. As a result, the biometric identity system provides increased individual security and reliable identification.

16 Claims, 13 Drawing Sheets

(56) References Cited

U.S. PATENT DOCUMENTS

| | | | |
|---|---|---|---|
| 2013/0246685 A1* | 9/2013 | Bhargava | G06F 21/00 |
| | | | 711/6 |
| 2015/0278495 A1* | 10/2015 | Yu | G06F 21/32 |
| | | | 713/186 |
| 2016/0261411 A1* | 9/2016 | Yau | G06F 21/445 |
| 2016/0330027 A1* | 11/2016 | Ebrahimi | H04L 9/0637 |
| 2017/0317833 A1* | 11/2017 | Smith | G06Q 20/3829 |
| 2018/0253539 A1* | 9/2018 | Minter | H04W 12/069 |
| 2018/0285879 A1* | 10/2018 | Gadnis | G06F 16/1805 |
| 2018/0332066 A1* | 11/2018 | Moynahan | H04L 63/14 |
| 2019/0013931 A1* | 1/2019 | Benini | H04L 9/3033 |

* cited by examiner

US 11,139,978 B2

PORTABLE BIOMETRIC IDENTITY ON A DISTRIBUTED DATA STORAGE LAYER

PRIORITY CLAIM

This application claims priority to European Patent Office Application No. EP17306091.4, filed with the French Patent Office on Aug. 23, 2017, which claims priority to European Patent Office Application No. EP17305735.7, filed with the French Patent Office on Jun. 15, 2017, which are incorporated by reference by their entireties.

TECHNICAL FIELD

This disclosure relates to securely storing and controlling access to biometric identity.

BACKGROUND

Rapid advances in electronics and communication technologies have resulted in newly emerging complex unforgeable transaction chains implemented on top of distributed data storage layers. Blockchains are an example of a distributed data storage layer. Improvements in the hardware and software implementations of the distributed data storage layers, as well as their feature sets, will extend the distributed data storage layers into new areas that provide, e.g., increased security and portability of data.

DETAILED DESCRIPTION

Distributed data storage layers (DDSL) remove a need for trusted entities because of a decentralized consensus mechanism. Blockchain is an example of such a distributed data storage layer. Authenticity of data elements (including transactions of many different types) recorded or inserted by participants into a DDSL are further facilitated via digital signatures. The digital signatures may be based on asymmetric encryption techniques, including public/private key infrastructure. The data elements recorded in the DDSL, while being nearly unforgeable and unalterable, remain accessible to all participants of the DDSL via their DDSL nodes (e.g., blockchain nodes). In particular, each participant, not necessarily a trusted entity, may decrypt and access any data element in the DDSL using a public key of the party who has digitally signed the data element and inserted it into the DDSL. The traditional DDSL technology thus does not inherently provide privacy with respect to the recorded data elements. In reality, some data that are suitable for DDSL protection may be sensitive and private. For those types of data and related applications, an enhanced DDSL is described that in one aspect provides technical solutions for recording and verifying personal identities.

Figure 1:
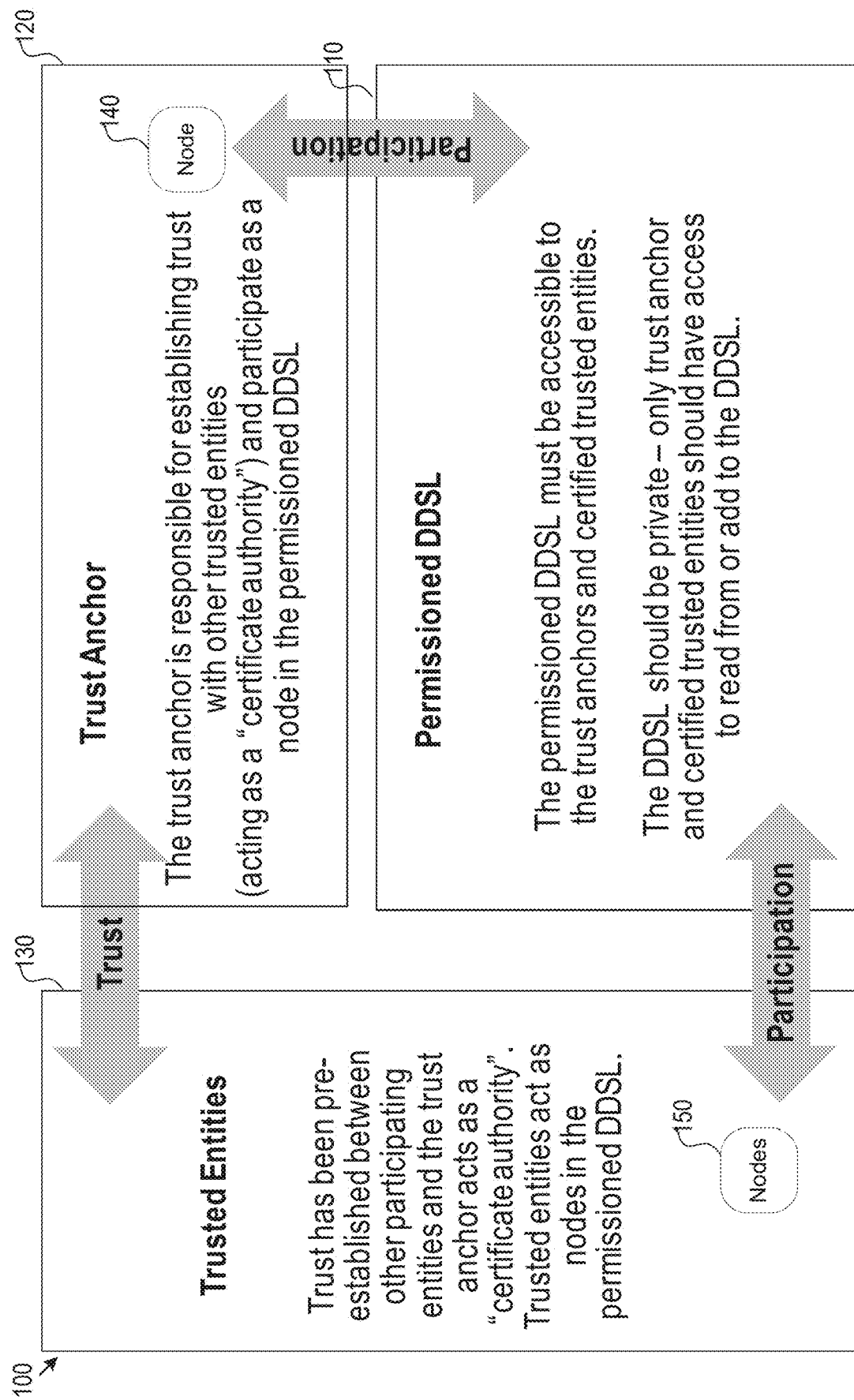
FIG. 1 shows an architecture for a distributed data storage layer system involving trusted entities.

Specifically, as shown in FIG. 1, a DDSL provides a trusted data storage layer environment. Such a DDSL 110 may be termed a "permissioned DDSL". In a permissioned DDSL, participating entities are trusted parties and thus may be allowed to access data elements that are of sensitive and private nature. The trust may be pre-established or pre-certified by a trust anchor 120. Typically, only pre-certified entities 130 may participate in the permissioned DDSL and have access to the data elements recorded in the permissioned DDSL 110. DDSL (such as a blockchain) is still distributed and public but permissioned (rather than a private storage layer).

The trust anchor 120 and the pre-certified entities 130 may participate in the permissioned DDSL 110 via corresponding DDSL nodes 140. Further, the trusted parties may be pre-certified with various levels of trust. Each level of trust may be associated with a predefined set of access privileges, which may include any combination of read or write and other access rights optionally enforced through a use of smart contracts (e.g., for easing key backups and recovery) with respect to the data elements in the permissioned DDSL 110. The permissioned DDSL nodes 140 may be configured according to the level of trust associated with the corresponding trusted entities. Entities with higher trust levels may, for example, have both read and write privileges and entities with lower levels of trust, however, may only have read privilege.

The certification and management of trusted entities 130 by the trust anchor 120 may be realized independent of the permissioned DDSL itself. To become a participant of the permissioned DDSL 110, for example, an entity may first establish trust within the permissioned DDSL via the trust anchor based on the predefined registration and certification process, rules and node implementation of the permissioned DDSL. The different levels of trust on the permissioned DDSL 110 may be determined by the rules of a consortium of the permissioned DDSL, and may be handled by a trust management application. In some implementations, there may be multiple trust anchors for the permissioned DDSL system.

Such a permissioned DDSL system may be used to maintain data elements that are sensitive or are of private nature and should be only accessible by trusted entities. For example, such permissioned DDSL may be employed to manage personal identities. Personal identities are a foundation for various social and economic activities. Many services provided by entities such as governmental agencies and financial institutions to individuals require identity verification. Personal identification issued by governmental authorities is traditionally provisioned based on physical documents, such as driver licenses, passports, and other forms of portable identifications. Verification of personal identities thus involves at least two aspects. In the first aspect, the authenticity of the physical identity documents is examined and verified (e.g., a passport is authenticate in that it is issued by a legitimate authority). In the second aspect, linkage between physical identity documents and the individuals holding the documents is verified. The traditional infrastructure of physical identities may be problematic because both verification aspects above may be easily compromised. For example, physical identity documents may be easily falsified, altered or tampered with, evading detection. Further, human verification of linkage between a physical identity document and the person holding it based on, e.g., photograph identity document, may be inaccurate.

The enhanced DDSL described below, in another aspect, supports implementations using a permissioned DDSL to store personal identity indexes, allowing certified trusted parties providing various social, economic and other services to verify authenticity of electronic personal identities carried in a portable electronic device (analogous to a passport) via the permissioned DDSL. The trust anchor 120 in this particular application would be, for example, an entity that creates, tracks, and updates personal identities in addition to managing certification of trusted entities 130. Alternatively, an identity provider and a trust anchor may be separate entities. In some implementations, there may be multiple identity providers. Further, biometrics of individuals may be captured and maintained by an identity provider and, for services requiring a high-level of security, the linkage between the electronic personal identities and the individuals holding it may be further verified based on biometric matching. In one implementation, such biometric verification processed may be facilitated by the permissioned DDSL but performed off-DDSL, as will be described in more detail below.

The enhanced DDSL provides technical solutions to the difficult challenges of establishing a unique identity, tracking, updating, and verification using portable electronic identities, permissioned DDSL, and biometrics. Some of the technical benefits include: enhanced identification of individuals, enhanced security of access to biometric data, and more secure permissioned access and use of personal identities and biometric data. Even though the disclosure below use the application context of personal identity as an example, the underlying principles of the permissioned DDSL are not limited to the personal identity context. Rather, they may be used in other contexts and applications involving sensitive data elements that are not suitable for processing by completely public and non-trusted DDSL platforms. Further, in the implementations below, the permissioned DDSL only stores personal identity indexes, which may not be as sensitive as data such as biometric and/or biographic information of individuals. As such, the implementations below may be modified, without deviating from the overall principles of this disclosure, to employ a non-trusted DDSL infrastructure rather than a permissioned DDSL, with other aspects of the disclosure remaining applicable.

Figure 2:
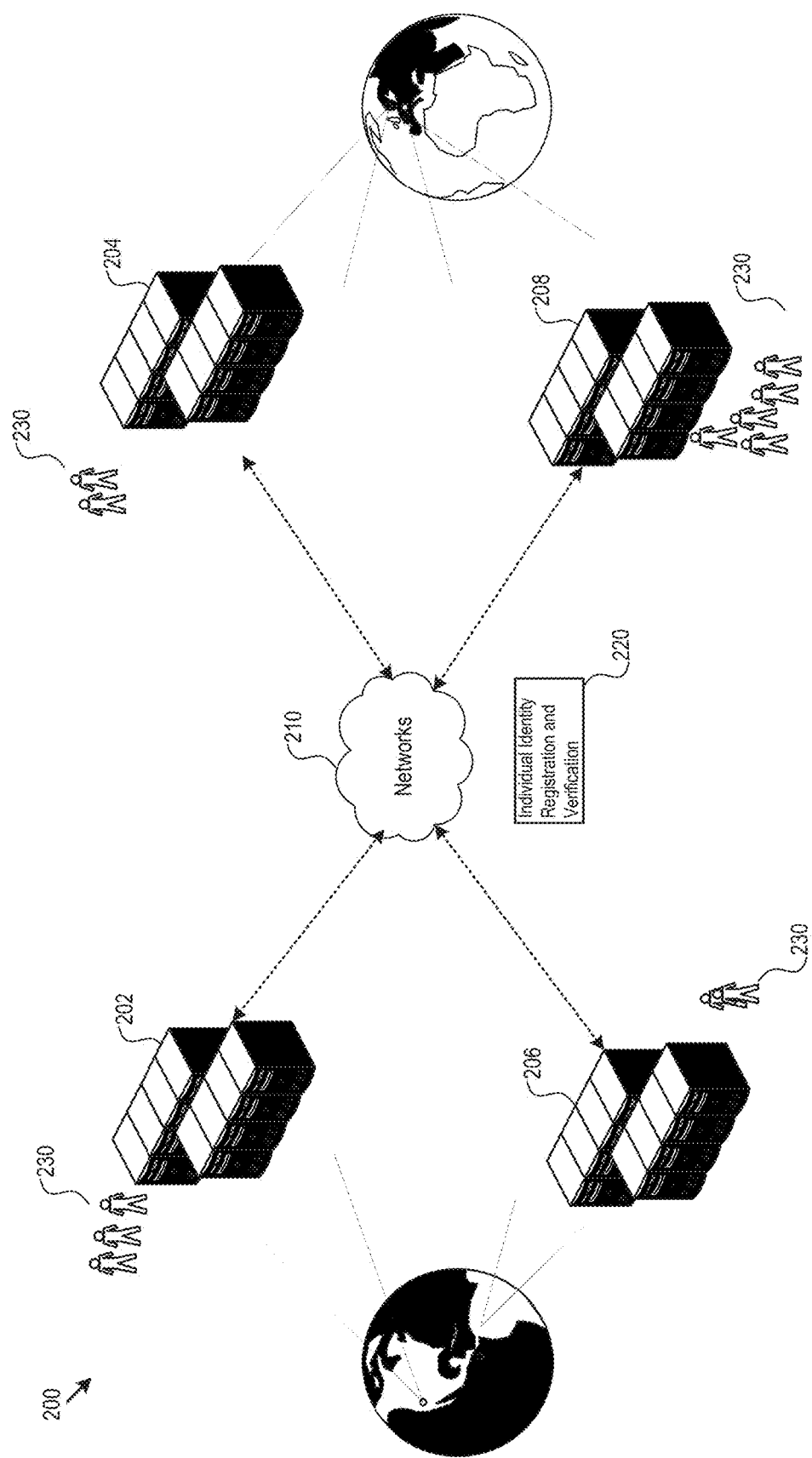
FIG. 2 shows a global network architecture for a service system.

FIG. 2 shows a global service network architecture 200 in which the provision of services to individuals requires verification of personal identities. Connected through the global network architecture 200 are service platforms, e.g., the service platforms 202, 204, 206, and 208, that provide a range of identity-based services ("services") to individuals 230. As examples, the services may include but are not limited to identity registration and renewal services by certified authorities (acting as identity providers); government services, e.g., border control, benefit enrollment, or police services; medical services, e.g., hospital admissions or doctor diagnostic portals; or private financial and business services, e.g., banking services or retail sales. Rendering of services provided by the service platforms 202-208 may involve either identity registration or identity verification (220) of the individuals 230. The service platforms 202-208 may be located in any geographic region, e.g., the United States, Europe, or Asia. The service platforms 202-208 may be connected via networks 210. The networks 210 may include private and public networks defined, for example, over any pre-determined or dynamic internet protocol (IP) address ranges.

Figure 3:
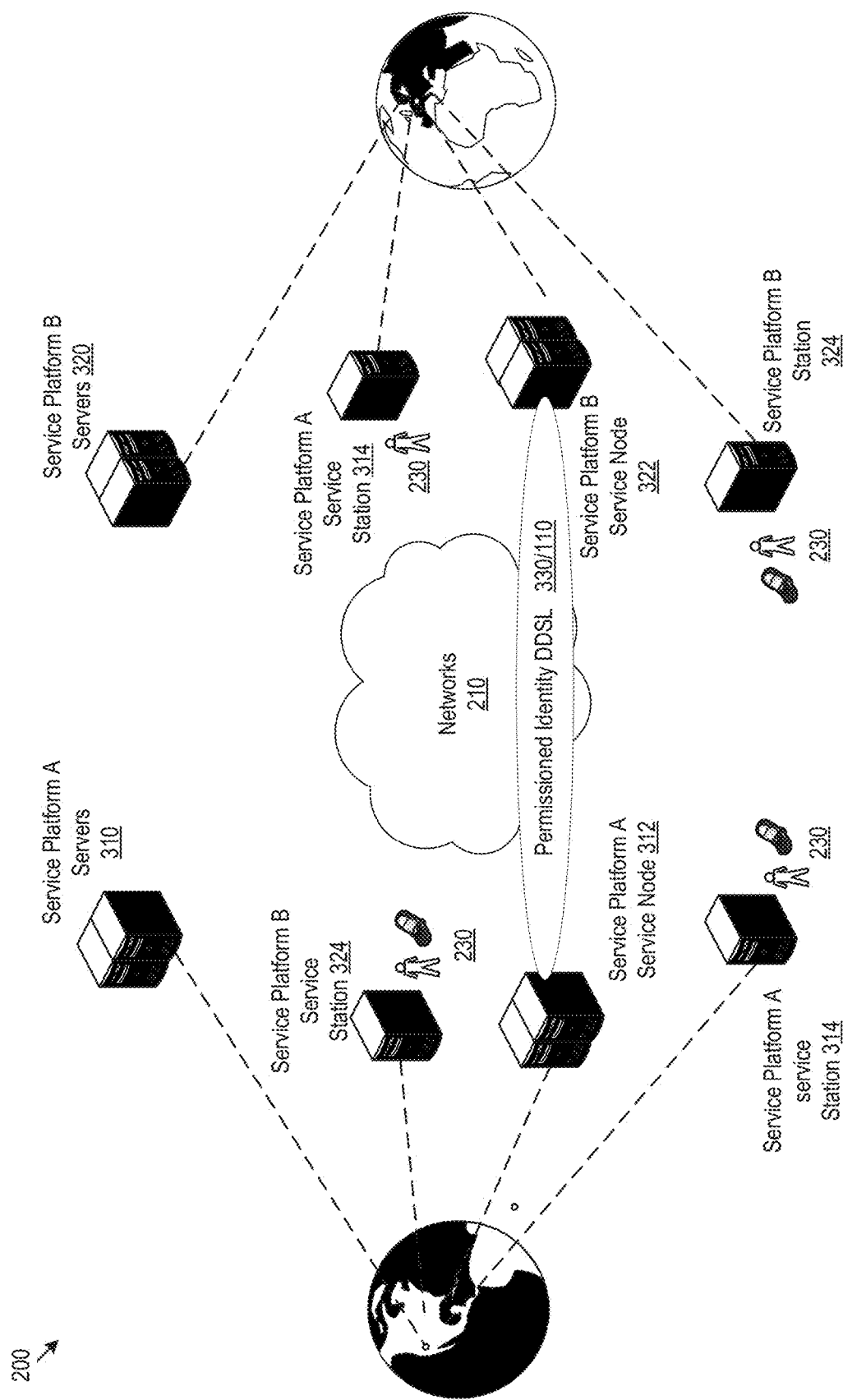
FIG. 3 shows a global network architecture for a biometric identification system in the context of providing services.

As an example implementation, FIG. 3 shows a specific global service network architecture 200 including service platforms A and B connected via the networks 210. Service platforms A and B may each include one or more servers (310 and 320, alternatively referred to as back ends), one or more service stations (314 and 324), and one or more service nodes (312 and 322). The service platforms A and B may each be global. As such, the servers 310 and 320, the service stations 314 and 324, and the service nodes 312 and 322 may be centralized or distributed in any geographic region. The distributed servers, service stations, and service nodes of the service platforms A or B may be connected via private or virtual private networks as part of the networks 210. The service stations 314 and 324 provide interfaces for an individual to obtain services from the service platforms A and B. The servers 310 and 320 provide processing, storage, identify verification, and other functions needed before, during, and after provision of the services. The service nodes 312 and 322 form a global identity verification system 330 among the service platforms. In one implementation, the global identity verification system 330 may be based on a permissioned DDSL 110. Accordingly, the service nodes 312 and 322 may be implemented as DDSL nodes of the permissioned DDSL 330/110.

Figure 4:
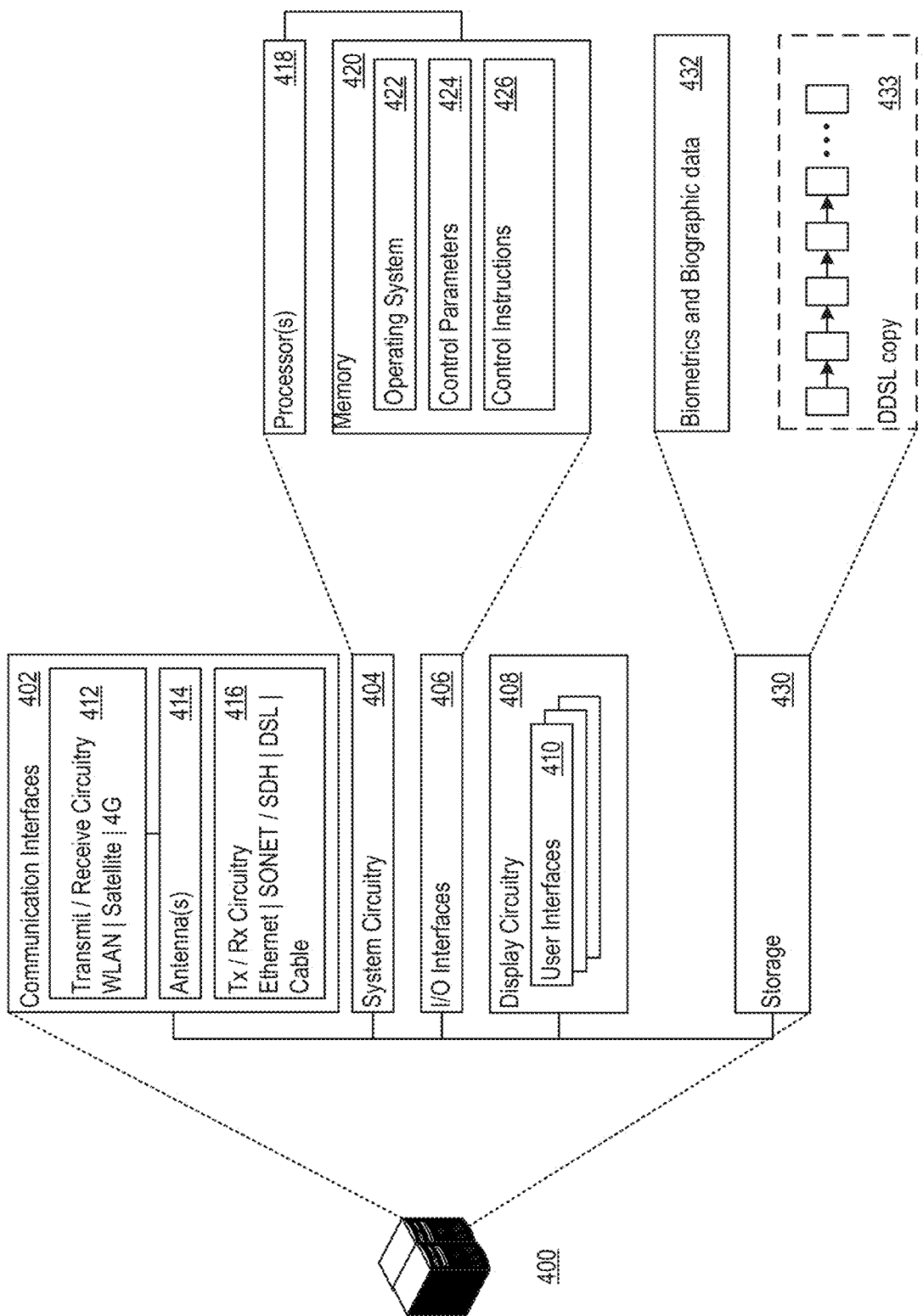
FIG. 4 shows an architecture for processing components of the biometric identification system.

FIG. 4 shows an example implementation of the servers 310 and 320, the service stations 314 and 324, and service nodes 312 and 322 of FIG. 3, as computer systems 400. Computer systems 400 may include communication interfaces 402, system circuitry 404, input/output (I/O) interfaces 406, storage 430, and display circuitry 408 that generates machine interfaces 410 locally or for remote display, e.g., in a web browser running on a local or remote machine. The machine interfaces 410 and the I/O interfaces 406 may include GUIs, touch sensitive displays, voice or facial recognition inputs, buttons, switches, speakers and other user interface elements. Additional examples of the I/O interfaces 406 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 402 facilitate connection of the computers 400 to the networks 210 (of FIGS. 2 and 3) and may include wireless transmitters and receivers ("transceivers") 412 and any antennas 414 used by the transmitting and receiving circuitry of the transceivers 412. The transceivers 312 and antennas 314 may support Wi-Fi network communications, for instance, under any version of IEEE 802.11, e.g., 802.11n or 802.11ac. The communication interfaces 402 may also include wireline transceivers 416. The wireline transceivers 416 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 404 may include hardware, software, firmware, or other circuitry in any combination. The system circuitry 404 may be implemented, for example, with one or more systems on a chip (SoC), application specific integrated circuits (ASIC), microprocessors, discrete analog and digital circuits, and other circuitry. The system circuitry 404 is part of the implementation of any desired functionality related to the provision of services and registration, renewal, authentication, and verification of identities. As just one example, the system circuitry 404 may include one or more instruction processors 418 and memories 420. The memories 420 stores, for example, control instructions 424 and an operating system 422. In one implementation, the instruction processors 418 executes the control instructions 424 and the operating system 422 to carry out any desired functionality related to the provision of services and registration, renewal, authentication, and verification of identities. The control parameters 424 provide and specify configuration and operating options for the control instructions 426, operating system 422, and other functionality of the computer systems 400. The storage 430 may be used to store various initial, intermediate, or final data for the provision of services and registration, renewal, authentication, and verification of identities in computer systems 400. For example, computer systems 400 for implementing servers for providing registration and renewal of identities may maintain in storage 430 biographic, biometric data, and corresponding identity information 432 for individuals. Service nodes (such as the DDSL nodes 312 and 322 of FIG. 2) may store DDSL copies 433 of the permissioned DDSL 110 as part of the global identity verification system 330 of FIG. 3 in the form of a permissioned DDSL.

Returning to FIG. 3, access to the permissioned DDSL system 330/110 may be limited only to service providers of service platforms have pre-established trust, unlike a traditional public and non-trusted DDSL system that allows any entity to participate without certification and relies purely on the consensus mechanisms implemented in the DDSL for trust. Service providers may be pre-certified and participate in the DDSL system 330/110 at various predefined levels of trust. Each certified service provider participates in the DDSL system 330/110 via its DDSL node. DDSL nodes of different trust levels may be configured with corresponding predefined functionalities for accessing the permissioned DDSL. For example, a node of higher trust level many be permitted to both read from and write to the permissioned DDSL. A node of lower trust level, however, may be only permitted to read from the permissioned DDSL.

Figure 5:
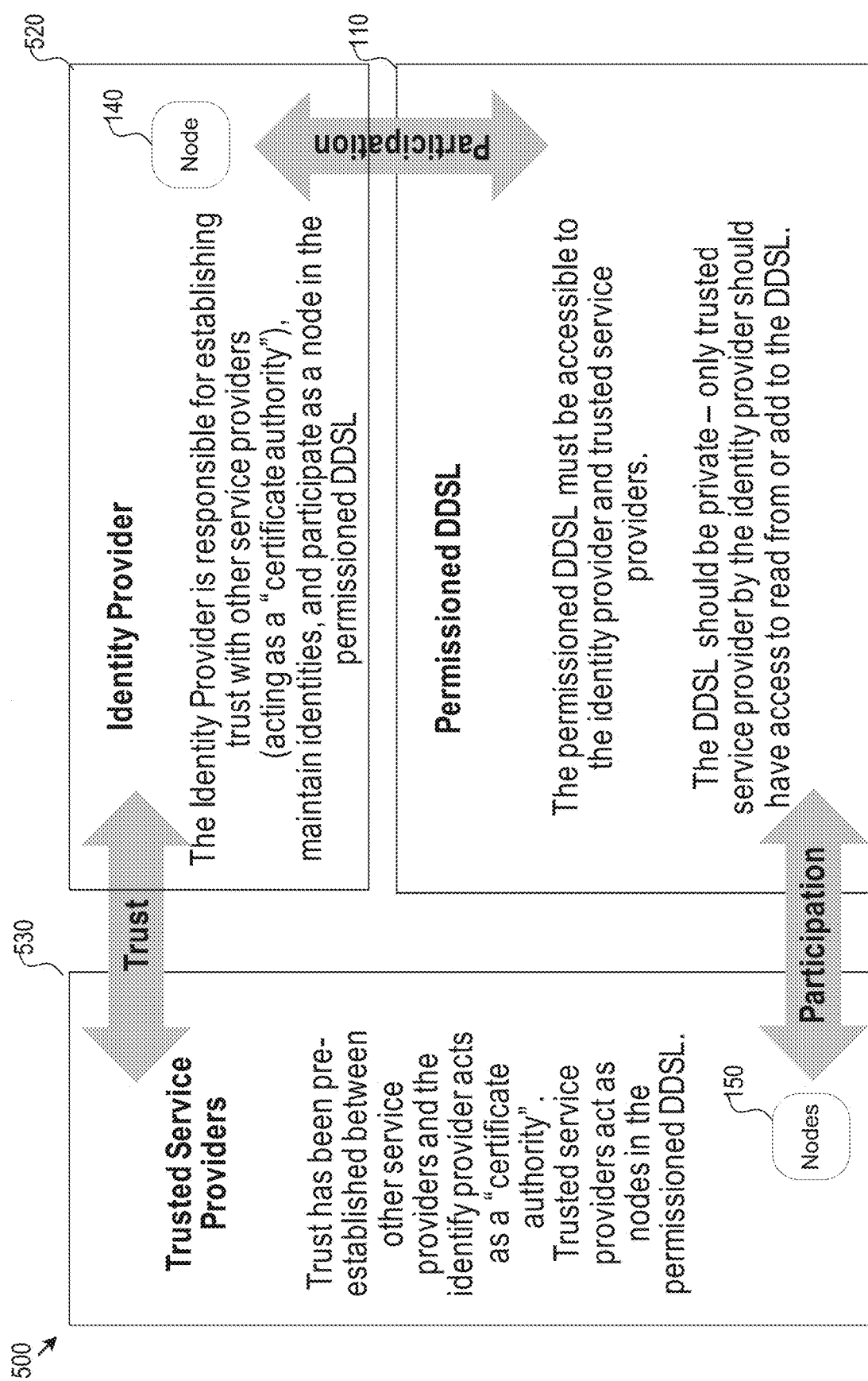
FIG. 5 shows a permissioned distributed data storage layer for identity verification for providing services.

FIG. 5 shows the permissioned DDSL 110 of FIG. 1 employed in the application context of personal identities. An identity provider 520 may be a special type of service provider (for providing identity registration services) and may or may not act as the trust anchor 120 of FIG. 1. Likewise, the trusted service providers 530 may be examples of the trusted entities 130 pre-certified by the identity provider 520. The identity provider 520 and the trusted service providers 530 may participate in the permissioned DDSL 110 via DDSL nodes 140 and 150. The participants of the permissioned DDSL 110 in the example implementation of FIG. 5 thus involve two general levels of trust. For example, service providers such as the United Nations may act as an identity provider 520 responsible for unique identification/registration and for pre-certification of other trusted service providers 530. Such special service provider may thus be of the highest level of trust. Identity providers may be general or specific. A general identity provider may provide identity to the general public. A specific identity provider may provide identity to individuals of particular demographic, geographic, and other scopes and context. For example, United Nations may act as an identity provider for refugees. The term identity provider may be alternatively referred as identity custodian in that it is not meant to be equivalent to just a single authority for providing identity for everyone. The other service providers 530 may be of lower level of trust and may include, for example, various governmental agencies and banks. The service nodes 140 and 150 acting as DDSL nodes may be configured in accordance of various levels of trust. Even though FIG. 5 separately describes an identity provider and a trusted service provider in relation to the permissioned DDSL, a trusted entity may act as both an identity provider and trusted service provider (with appropriate trust level). In a sense, the provision of identity (by an identity provider) is one type of trusted services. There may be multiple identity providers and trusted service providers certified by the trust anchor distributed throughout the system.

The general two-level permissioned DDSL of FIG. 5 is merely an example. Other implementations are contemplated. For example, the predefined levels of trust may include three levels, e.g., high, medium, and low. Entities acting as identity providers such as United Nations and other entities such as European Union, various central governments, and Federal Bureau of Investigation may be provided with high level of trust. Service providers such as banks, municipal governments, and some countries may be provided with medium level of trust. Other service providers such as merchants and retail stores may be provided with low level of trust.

The participating nodes of the permissioned DDSL 330/110 may each store a copy of the permissioned DDSL (e.g., a copy of the blockchain). Each copy of the DDSL contains linked data blocks of data elements. Data elements are added into the DDSL by participating nodes with write permission. Each data element is associated with an index (also referred to as a DDSL identifier, a DDSL index, a block index, a block identifier, a data element index, or a data element identifier) for identifying the data element in the DDSL. As such, the DDSL may be queried for specific data elements without having to traverse the entire linked data blocks. The data elements added by the DDSL nodes may be transactions related to personal identities. For example, a data element may be an identity index for an individual, or may be a transaction that invalidates an earlier obsolete identity index (e.g., an earlier identity index that has been renewed or updated and is thus rendered obsolete). The format and contents of the data elements in the permissioned DDSL maybe predefined with one example implementation discussed in detail below.

Authenticity of the data elements in each data block of the permissioned DDSL may be achieved using cryptographic technologies. For example, digital signature based on public and private key cryptography may be used to ensure that a data element to be inserted into the DDSL is signed by and originates from its proclaimed submitting entity. In particular, each entity participating in the DDSL system and who wishes to store data elements in the DDSL may be in possession of a private key that is kept secret at all times (e.g., managed by a Hardware Secured Module, or HSM). A public key associated with the private key (e.g., mathematically) may be derived from the private key and may be made publicly available (e.g., managed by a Public Key Infrastructure, or PKI). When a participating entity wishes to store a data element in the DDSL, the entity may first digitally sign the data element using its private key before the data is submitted for insertion in the permissioned DDSL. The signed data element may be decrypted by anyone having access to the permissioned DDSL and the public key of that entity. Any tampering of the signed data will results in unreadable data when being decrypted using the public key. As such, signing using the private key represents a digital signature of the data element by the entity and any tampering of the signed data is easily detected.

Thus, the identity provider and trusted service providers participating in the permissioned DDSL may be each be associated with a set of private and public keys. The private keys may be used by the participating entities to sign data elements to be inserted into the permissioned DDSL. The public keys may be used by others to decrypt data elements inserted into the permissioned DDSL. For example, the identity provider node may submit a data element associated with identity index of a particular individual into the permissioned DDSL 230 by signing the data element with its private key. Other certified trusted service providers may locate the data element in the permissioned DDSL using a data element identifier for the data element and decrypt the data element using the known public key of the identity provider during the process of conducting identity verification.

The permissioned DDSL 330/110 may further implement other functionalities for detecting tampering of the recorded data elements. As such, the data elements inserted into the permissioned DDSL may be protected from being altered at a later time. The International Patent Application No. PCT/CN2017/083597 filed with the State Intellectual Property Office of China on May 9, 2017 by the same Applicant provides a detailed description of these functionalities. In addition, a consensus mechanism may be implemented among the participating DDSL nodes to prevent any of the participating nodes from inserting uncertified or unauthorized identity index data elements.

Figure 6:
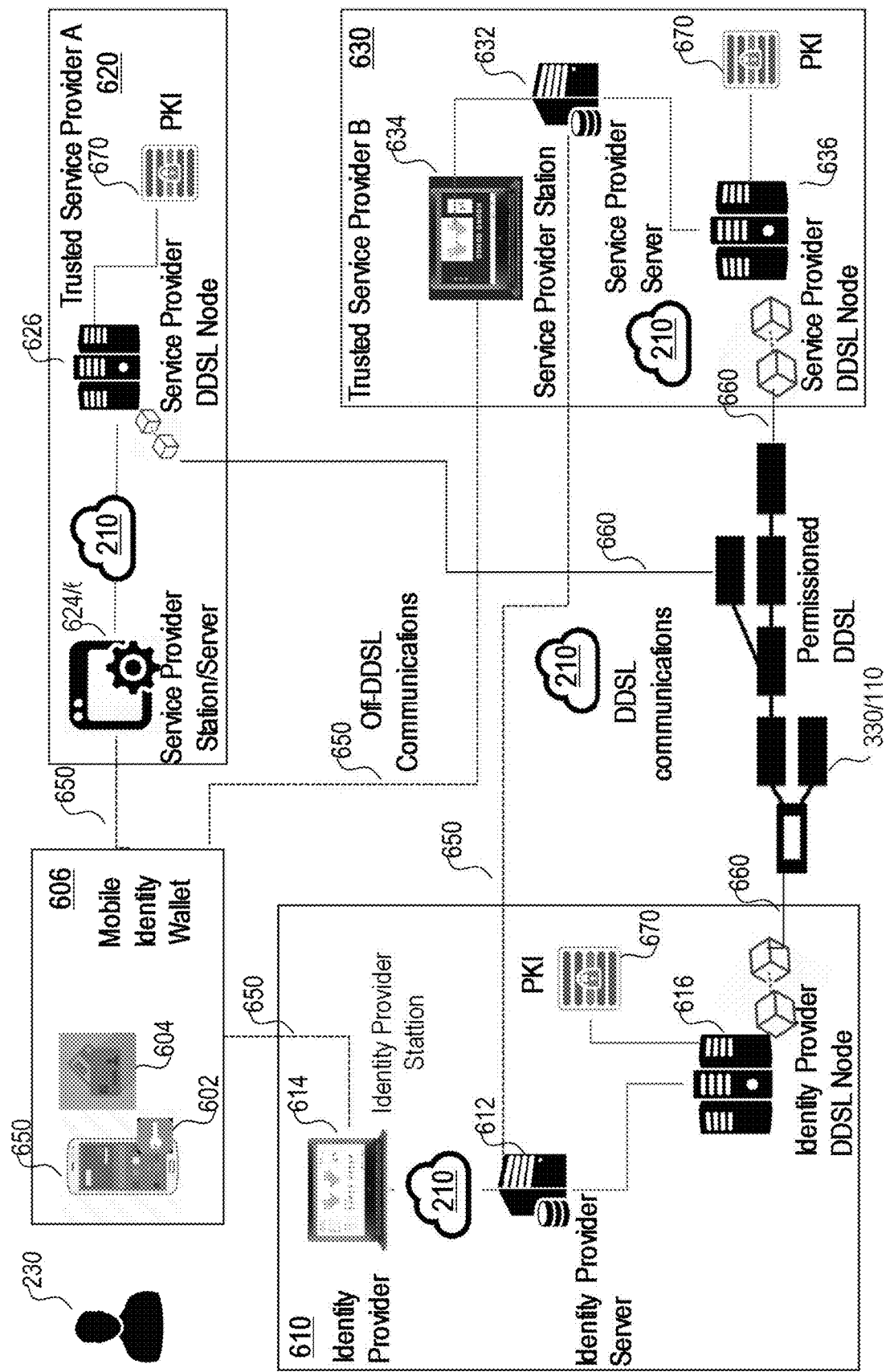
FIG. 6 illustrates modes of communications between participants of the biometric identification system.

FIG. 6 illustrates a more detailed implementation of modes of communication between an individual (230, alternatively referred to as "user"), an identity provider (610), a trusted service provider A (620), and a trusted service provider B (630). The individual 230 may be associated with a portable identity device in the form of, e.g., a mobile phone 602 or smart card 604, collectively referred to as a mobile identity wallet 606. The mobile identity wallet 606 may be used to store digital identity of the individual 230, analogous to an electronic passport (ePassport). The identity provider 610 is responsible for providing identity registration, renewal, and management. The identity provider 610 may provide its functionalities via an identity service platform including one or more identity provider stations 614, one or more identity provider servers 612, and one or more identity provider DDSL nodes 616. Trusted service providers A (620) and B (630) may each include one or more service provider stations, service provider servers, and service provider DDSL nodes, shown in FIG. 6 as 622, 624, 626, 632, 634, and 636.

The DDSL nodes 616, 626, and 636 form the permissioned DDSL system 330/110. Communications between the DDSL nodes 616, 626, and 636, as part of the functionality of the permissioned DDSL 330/110 may be referred to as DDSL communications, as shown by the solid lines 660 in FIG. 6 connecting the DDSL nodes 616, 626, and 636 of the permissioned DDSL 330/110. Public keys for various DDSL nodes may be managed by the Public Key Infrastructure (PKI) 670. The user 230 may interact with the identity provider 610, the trusted service providers A and B (620 and 630) via service stations 614, 624, and 634, for registration and renewal of identity, and for obtaining various services that requires identity verification. In one implementation, the user 230 may not be a participant of the permissioned DDSL. As such, the communications between the user 230 and the service stations 614, 624, and 634 may be off-DDSL, as shown by the dotted lines 650 in FIG. 6.

In addition, data elements in the permissioned DDSL 330/110 may contain limited information sufficient for functioning as identity indexes for the purpose authenticating identity, as will be described in more detail below. Other information related to identity verification may be further communicated between the servers of the identity provider 610 and service providers 620 and 630. These other communications for information not contained in the permissioned DDSL, may be made off-DDSL, as indicated by the dotted line 650 between the server 632 of the trusted service provider B (630) and the server 612 of the identity provider 610. Some trusted service providers, such as trusted service provider A (620), may only need to communicate with the user 230 directly and with the permissioned DDSL 330/110 for authentication of attestations in, or indexed by, the mobile identity wallet 606. In that case, the server 624 may not need to have off-DDSL communications with servers of the identity provider 610 and other trusted service providers such as 630.

Figure 7:
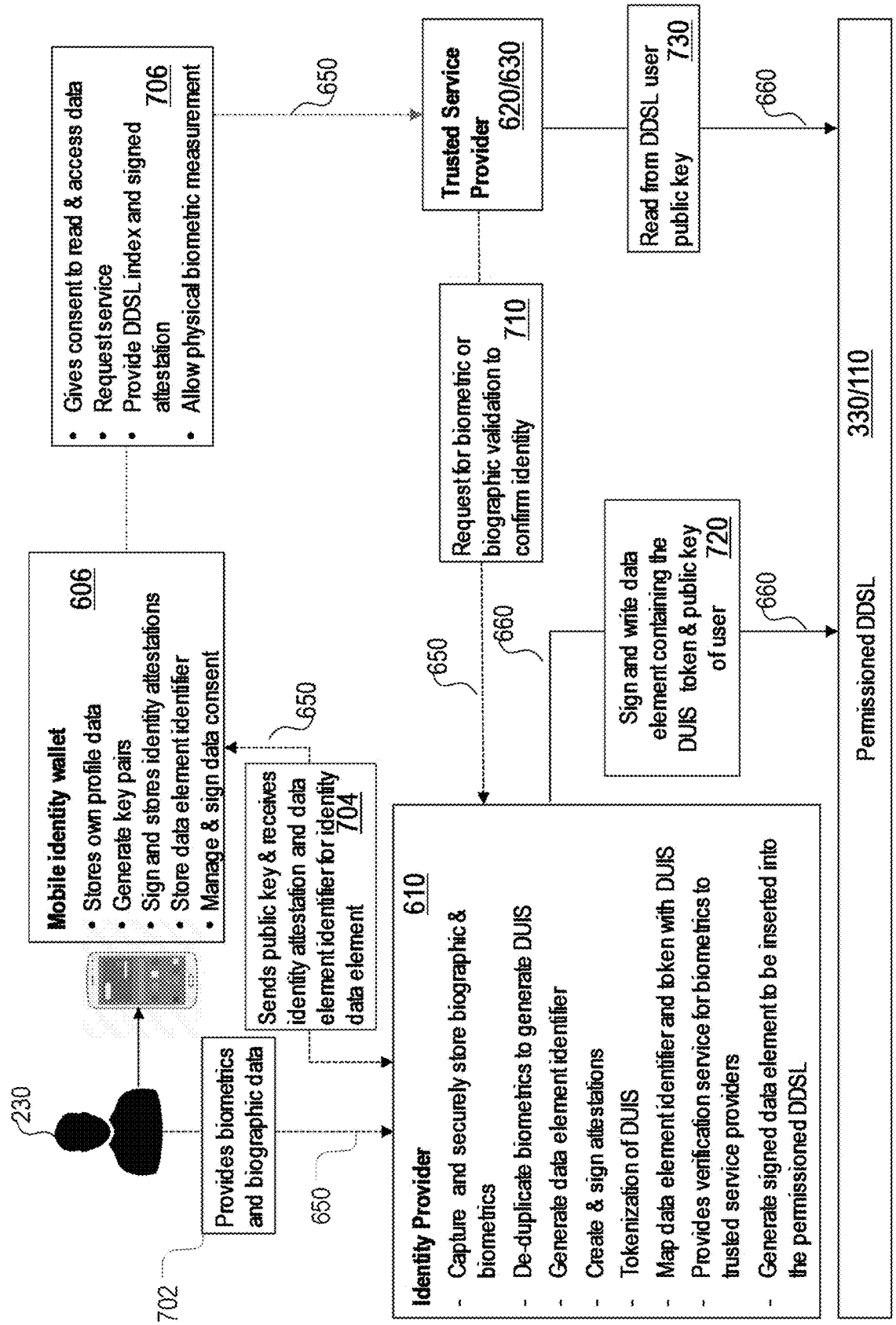
FIG. 7 illustrates functions of participants of the biometric identification system and types of information communicated between the participants.

FIG. 7 illustrates, as one exemplary implementation, functionalities of the mobile identity wallet 606, the identity provider 610, and the trusted service provider 620/630 of FIG. 6, as well as exemplary types of information communicated via the permissioned DDSL 330/110 (660) or communicated off-DDSL (650). Similar to FIG. 6, dashed communication lines labeled as 650 represent off-DDSL communications and solid communication lines labeled as 660 represent communication with the permissioned DDSL 330/110.

In the specific implementation of FIG. 7, the user 230 may register with the identity provider 610 by providing biographic data and by allowing the identity provider to collect biometrics information (702). The biometrics collected from user 230 may include but are not limited to fingerprint, facial image, iris image, voice samples, DNA sequences, palm veins, and palm print. The mobile identity wallet 606 belonging to the user 230 may store users profile data, such as biographic data. The mobile identity wallet 606 may further be responsible for generating a pair of private and public keys for the user. Even though the user 230 does not have privilege to write to the permissioned DDSL in some implementations, the private key for the user may be used to digitally sign various off-DDSL communication messages from the user to the identity provider and to other trusted service providers. For example and as will be described in more detail later, the user may provide digitally signed consent for the trusted service provider 620/630 to access biometric or biographic information of the user stored with the identity provider (706). Such a consent may be signed using the private key of the user. For another example, an identity attestation signed by the identity provider to be described in more detail later may be further signed by the user using the user's private key. The user's private key may be managed by a HSM component included in the mobile identity wallet 606.

The mobile identity wallet 606 may additionally be responsible for storing the identity attestation signed by both the identity provider 610 using the private key of the identity provider and the user by the user's private key after the identity provider creates an identity and the corresponding identity attestation for user 230. The signed identity attestation in the mobile identity wallet 606 forms the main form of identity to be used for identity verification by the trusted service provider 620/630. The mobile identity wallet 606 may further store the data element identifier associated with the identity data element (the identity index) for the user in the permissioned DDSL 330/110. As discussed below, this data element identifier is generated by the identity provider 610 when inserting the identity data element for the user into the permissioned DDSL and may be signed by the identity provider using its private key.

Continuing with FIG. 7, the identity provider 610 may receive biographic data of the user and the user public key at a service station of the identity provider 610. The identity provider 610 may further collect a set of biometrics from the user. The identity provider 610 is responsible for secured storage and removal of the user biographic and/or biometric information in conformance with the privacy constructs of the solution. The set of biometrics collected from user 230 may include but are not limited to fingerprint, facial image, iris image, voice samples, DNA sequences, palm veins, and palm print. The set of biometrics to be collected by the identity provider may vary widely depending on the provider, and different providers may collect different combinations of biometric data corresponding to the underlying business case(s. The size of the biometrics set may be predetermined based on the size and diversity of population the identity provider is expected to manage. A representative set of biometrics may be predetermined such that the predetermined set of biometrics can be used to uniquely identity each individual within the population even when some individuals may lack certain biometrics (e.g., some individual may lack recognizable finger print either due to lost fingers or due to finger wear as a result of prolonged heavy manual labor). A larger set of biometrics may be gathered for a larger population set. For example, for a small population set, only fingerprint may be sufficient for effectively identifying each individual in the population. However, for a large population, fingerprint alone may not be sufficient and a combination of fingerprint, facial image and even other biometrics may be required to uniquely identify each person in the population.

The identity provider 610 is further responsible for de-duplicating the set of collected biometrics that may have already been registered in order to prevent double registration. The identity provider 610 is further responsible for generating a digital unique identification sequence (DUIS) for the user 130. The DUIS may be any sequence of symbols. For example, the DUIS may be a numerical number contained a predetermined number of digits. Alternatively, the DUIS may be a mixed sequence of numerals and alphabets. In one implementation, the DUIS may be generated by the identity provider 610 as a unique random numerical number. In another implementation, the DUIS may be generated by seeding from the set of measure biometrics data. The seeding process may be developed such that preferably a same unique DUIS is generated from sets of biometrics independently measured from a particular user. The identity provider 610 may further generate an identity data element to be inserted into the permissioned DDSL 330/110. The data element may include, for example, the public key for the user, and a token generated from the DUIS. Accordingly, the identity provider 610 may additionally be responsible for generating a token of the DUIS. A token rather than the DUIS is inserted into the permissioned DDSL for an added level of security because other trusted service providers may then only be able to access the token via the permissioned DDSL rather the DUIS. To maintain such security for the DUIS, it is preferable that the DUIS cannot be backtracked easily from the token. As such, the generation of the token from the DUIS may be implemented suing a one-way function, such as a hash function and the like. The data element may then be signed by the identity provider 510 using its private key and inserted into the permissioned DDSL (720). The data element identifier for the inserted data elements is tracked by the identity provider and the data element identifier may be signed by the identity provider using its private key. The signed data element identifier for the inserted data element may be provided to the mobile identity wallet 606 (704). The identity provider 610 may further maintain a mapping between the DUIS, the token, the data element identifier of the data element associated with the token and DUIS, and the biographic and/or biometric information securely stored by the identity provider for the user 230. Such a mapping, for example may be stored in the data storage 430 of FIG. 4 for the identity provider 610.

The identity provider 610 is further responsible for creating and signing the identity attestation of identity for the user 230. The attestation may simply be a statement by the identity provider that it has verified the user identity physically. The identity provider may sign the attestation using its private key. In one implementation, the identity attestation may include a set of attribute-level verification, e.g., name and date of birth. The attestation may further contain attribute level biometrics information, i.e., the type of biometrics information of the user that the identity provider tracks. The attestation preferably may not contain actual personal identifiable information (PII). The attestation signed by the identity provider 610 may be provided to the mobile identity wallet 606 of the user 230 (704). As discussed above, the attestation signed by the identity provider and received at the mobile identity wallet may be further signed by the mobile identity wallet using the private key of the user.

Continuing with FIG. 7, the trusted service provider 620/630 receives request for service from user 230 (706). The trusted service provider 620/630 may further receive the doubly signed identity attestation and data element identifier (which may be signed by the identity provider) of the user data element (identity index) in the permissioned DDSL from the mobile identity wallet for verifying the authenticity of the identity attestation (706). The trusted service provider 620/630 may additionally receive a signed consent to read and access biographic and/or biometric data of the user if further verification of identity is desired (i.e., verification that the mobile identity wallet and the identity attestation stored therein belongs to the user holding the mobile identity wallet) (706). The trusted service provider 620/630 may perform the verification of the authenticity of the identity attestation by accessing the permissioned DDSL 330/110 using the data element identifier from the mobile identity wallet (730). The trusted service provider 620/630 may further perform verification of the user biometrics and biographic information by capturing physical biometric measurements from the user (706) and communicate with the identity provider 610 for verification (710).

In the implementations of FIGS. 6-7 above, the functions of the identity provider 610 and trusted service providers are described separately. In other alternative implementations, a trusted entity may be both an identity provider and a trusted service provider. As such, a trusted entity may perform a mixture of any of the functions of an identity provider and a trusted service provider. For example, a trusted service provider may act as an identity provider and thus may create and sign identity attestation for users.

Figure 8:
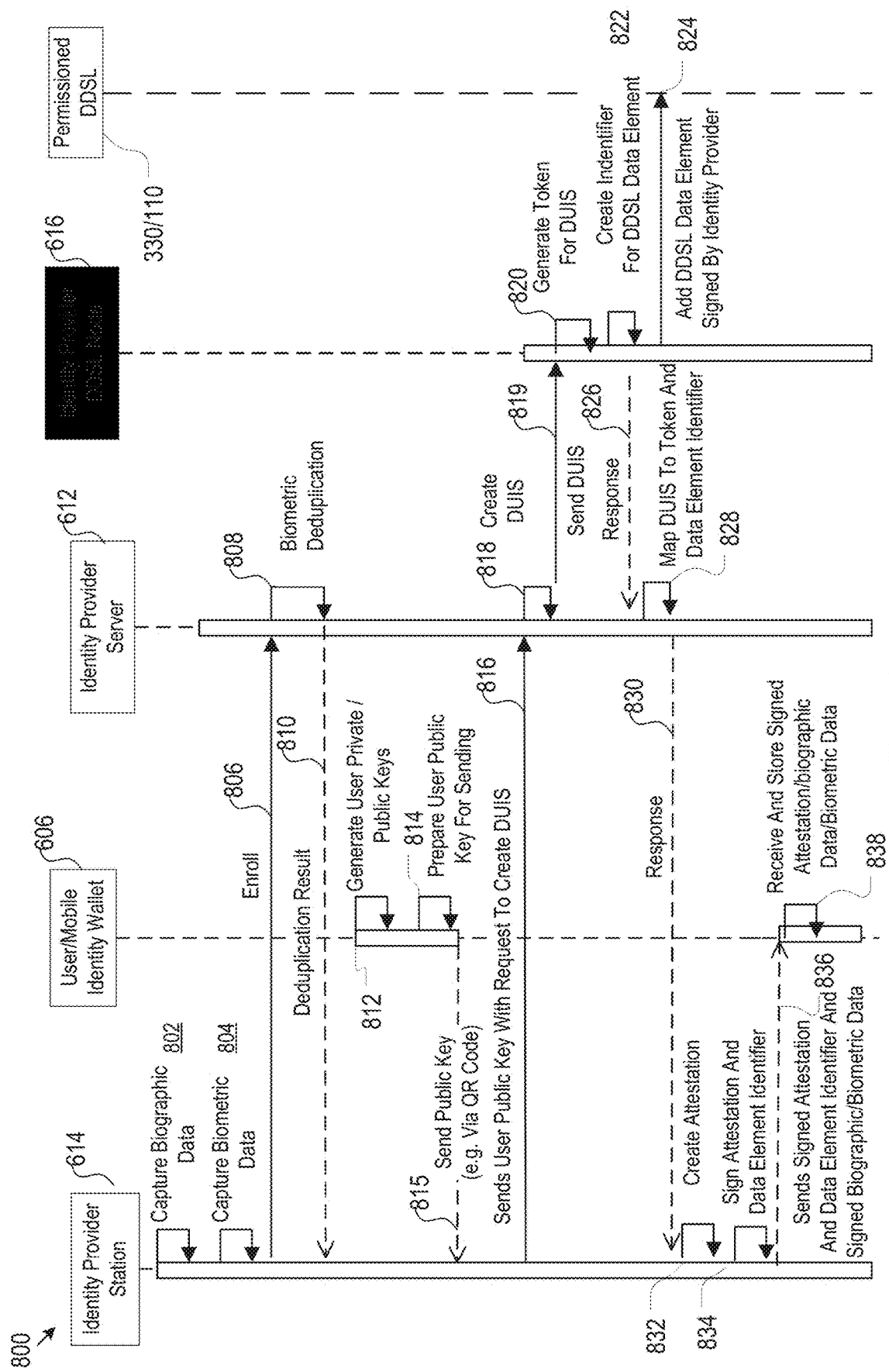
FIG. 8 shows message flow between data platforms for generating digital identity and creating a distributed data storage layer identity index.

FIG. 8 shows in more detail an exemplary logic flow 800 for establishing an identity for a user. Biographic and biometric data are first captured by the identity provider station 514 (802 and 804). The identity provider station communicates with the identity provider server 612 for requesting enrollment of the user (806). The identity provider server 612 performs biometric deduplication upon receiving the enrollment request (808). The identity provider server 612 then sends the deduplication results to the identity provider station 614 (810). In the meanwhile, the mobile identity wallet 606 of the user proceeds to generate the private/public key pair for the user (812). The mobile identity wallet 606 may then prepare and securely send the generated public key to the identity provider station 614 (814 and 815). The sending of the public key may be based on Quick Response (QR) code. As such, the mobile identity wallet 606 may first prepare the user public key into a QR graphic format (814) and then communicate the QR code of the user public key to the identity provider station 614 (815). The communication of the QR code may be accomplished by a QR scanner of the identity provider station 614. Specifically, the scanner of the identity provider station 614 may read the QR code displayed on the mobile identity wallet 606 of the user.

The identity provider station 614 may then send the user public key to the identity provider server 612 with a request to create a DUIS for the user (816). In response, a DUIS is generated by the identity provider server 612 (818). The identity provider server 612 then sends the generated DUIS to the identity provider DDSL node 616 (819). The identity provider DDSL node 616 then generates a token from the DUIS (820) and prepares to insert a data element containing the public key of the user and the token generated from the DUIS for the user into the permissioned DDSL 330/110. Alternatively, the token may be generated by the identity provider server 612 and communicated to the identity provider DDSL node 616. A data element identifier for identifying the data element in the permissioned DDSL is created by the identity provider DDSL node 616 (822) and the data element is signed using the private key of the identity provider and inserted into the permissioned DDSL (824). The identity provider DDSL node further sends the token and the data element identifier of the inserted data element to the identity provider server 612 (826). The identity provider server 612 then maps the received token and data element identifier to the corresponding DUIS (828) and stores the mapping.

The identity provider server 612 then informs the identity provider station 614 of the completion of insertion of data element as an identity index of the user into the permissioned DDSL (830). The identity provider station 614 then proceeds to create an identity attestation (832). The identity attestation may be referred to as attestation. The attestation and the data element identifier for the inserted data element is then signed using the private key of the identity provider and sent to the mobile identity wallet 606 of the user (836). The identity provider station may further sign user biographic data and or biometric data (captured in 802 and 804) using the private key of the identity provider and send it to the mobile identity wallet 606 of the user along with the signed identity attestation (836). The communication of the identity attestation from the identity provider 610 to the mobile wallet 606 may be performed using any secure communication protocol. The mobile identity wallet 606 receives and stores the identity data including the signed attestation, the signed data element identifier for the identity data element for the user inserted in the permissioned DDSL, and optionally the signed biographic data and/or biometric data (838). In one alternative implementation, the data element identifier may not need to be signed by the identity provider using its private key. In that implementation, the mobile identity wallet may store the data element identifier without any digital signature. Before storing the received attestation, the mobile identity wallet 606 signs it using the private key of the user (838). As such, the attestation may be doubly signed and stored in the mobile identity wallet. In an alternative implementation, the mobile identity wallet my store the attestation only signed by the identity provider but sign the attestation when providing it to a service provider for identity authentication and verification.

By the implementation of FIG. 8, identity of a user may be registered and created by the identity provider. The user may be uniquely identified by a DUIS. The public key for the user and the token generated from the DUIS are stored by the identity provider in the permissioned DDSL. Such a data element is protected from being altered by the digital signature of the identity provider and the consensus mechanism inherent to the permissioned DDSL. The captured biometric and/or biographic data, however, is not stored in the permissioned DDSL and not directly accessible by the participants of the permissioned DDSL. The biometric and/or biographic data is securely stored by the identity provider.

Figure 9:
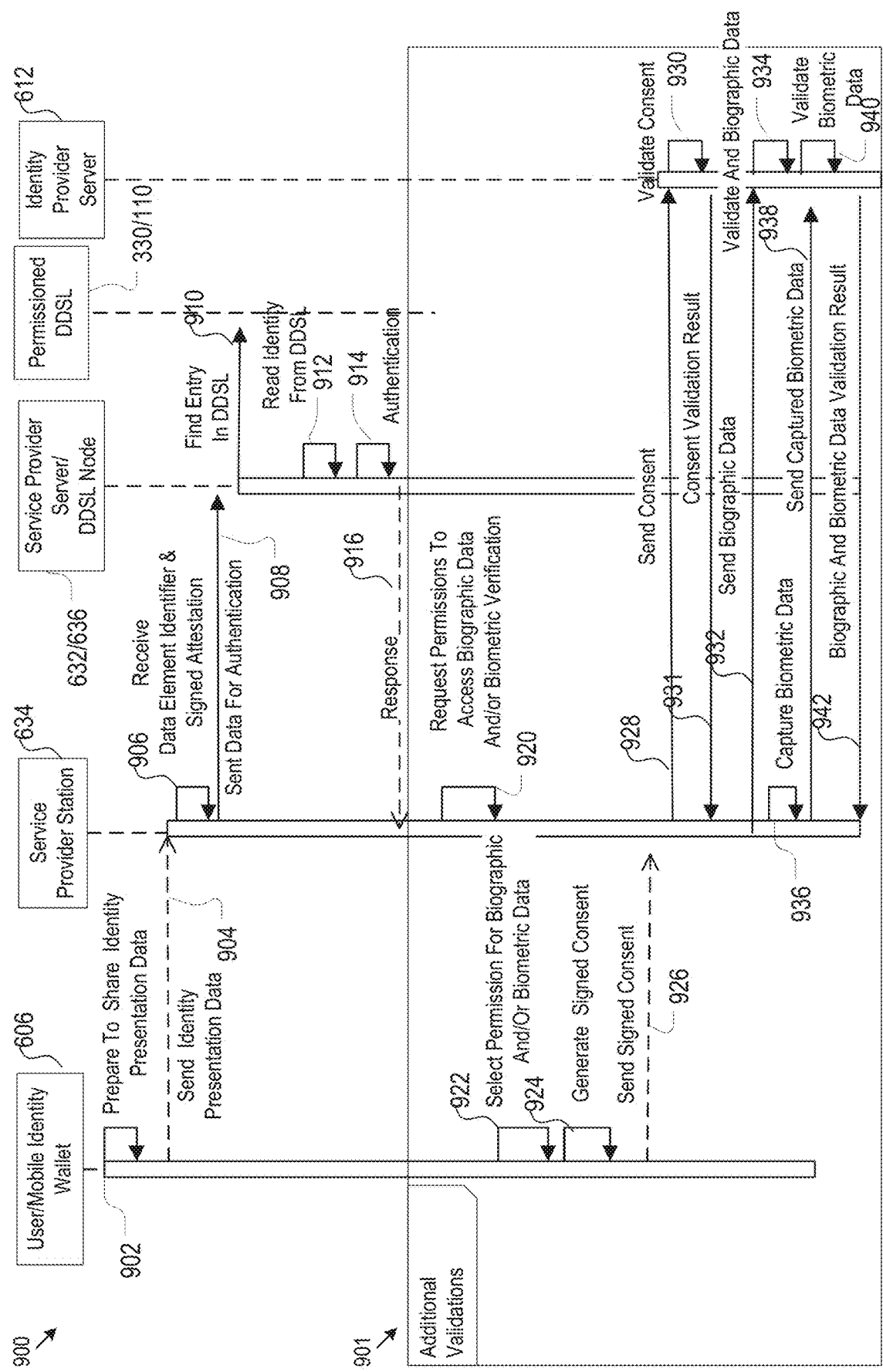
FIG. 9 shows message flow between data platforms for requesting identity authentication and biometric identity verification.

FIG. 9 illustrates an exemplary logic flow that a biometric identity system running on a DDSL may implement for the user to obtain a service from a service provider requiring identity verification. The first portion of FIG. 9 indicated by 900 illustrates a logic flow for authentication by the service provider that the digital identity (e.g., the attestation) carried in the mobile identity wallet 606 was issued and attested to by the identity provider 610. The second portion of FIG. 9 indicated by 901 illustrates a logic flow for further verification of the biometric and/or biographic information of the user. As previously discussed, this second portion helps verify that the mobile identity wallet belongs to the individual holing the mobile identity wallet.

For the first portion of authentication 900, the user holding the mobile identity wallet 606 may approach a service provider station 634 for obtaining service. The user may use the mobile identity wallet 606 to present to the service provider station 634 identity presentation data such as identity attestation signed by the identity provider and the user and the data element identifier (either signed by the identity provider or unsigned) for the identity index data element for the user in the permissioned DDSL (902 and 904).

The service provider station 634 receives the doubly signed attestation and the signed or unsigned data element identifier (906). The service provider station 634 may then send the data element identifier and doubly signed attestation to the DDSL node 636 of the service for authentication (908). If the data element identifier was not signed by the identity provider, the service provider DDSL node 636 may directly use the unsigned data element identifier to look up the corresponding identity index data element in the permission DDSL (910). In the case that the data element identifier was signed by the identity provider, the service provider DDSL node 636 may first use the public key of the identity provider to decrypt the signed data element identifier and then use the decrypted data element identifier to look up the corresponding identity index data element in the permission DDSL (910). The service provider server or DDSL node 632/636 may then use the public key of the identity provider to decrypt the corresponding identity index data element located and identified from the permission DDSL to obtain the public key of the user (912). For authentication of the attestation (914), the public key of the user may be used to decrypt the attestation signed by the user to obtain attestation signed by the identity provider. The attestation signed by the identity provider may then be further decrypted by the service provider server or DDSL node 632/636 using the public key of the identity provider. As such, the attestation may be read and analyzed by the service provider server or DDSL node 632/636 to complete the authentication 914 that the content of the identity attestation was indeed signed by the identity provider and signed by the user. The authentication result is sent to the service provider station 634 and the mobile identity may be accepted (916). Functionalities of the service provider other than accessing the permissioned DDSL may be performed by the service provider server 632 rather than the service provider DDSL node 636.

The logic flow 900 of FIG. 9 above authenticates that the mobile identity wallet 606 contains a valid identity attested by the identity provider. If the service provider desires to further verify that the mobile identity wallet 606 belong to the person holding the mobile identity wallet, logic flow shown in 901 of FIG. 9 may be performed. Specifically, the service provider station 634 may request permission for further verification of biographic and/or biometric information (920). Upon such a request, the user may give permission via the mobile identity wallet 606 to the service provider station to validate biographic and/or biometric data (922). The permission may be provided in the form a consent and the consent may be signed by the user using the private key of the user (924). The signed consent may be sent from the mobile identity wallet 606 to the service provider station 634 (926) and further sent to the identity provider server 612 (928). The identity provider server 612 validates the user consent (930) by checking the digital signature on the consent by the user and confirm validity of the consent (931). Upon confirming the validity of the user consent, the service provider station 634 may send user biographic data to the identity provider server for verification (932). The verification process by the identity provider server 612 may involve comparing received biographic data with the biographic data stored in the identity provider server for the user (934). Further, the service provider station may physically capture the biometric information of the user (936) and then send the captured biometric data to the identity provider server 612 (938). The identity provider server then validates the biometric information by comparing the received biometric information captured by the service provider station with the biometric information stored in the identity provider server for the user (940). The validation result may then be sent to the service provider server 632 and station 634 (942). In another implementation, the identity provider server, after receiving the user consent, may provide requested biometric information so that the service provider may compare the capture biometric information locally.

In one alternative implementation, the validation process may be done without the identity provider, if the user's biographic and/or biometric data, signed by the service provider, was sent to and stored in the mobile wallet of the user (see, 836 of FIG. 8). In such situation, once the user give consent, the service provider may, for example, decrypt the biometric data in the mobile wallet of the user using the public key of the identity provider, and compare the decrypted biometric data with biometric data that the service provider captures from the user.

The user consent generated at step 924 may contain restriction for the biographic and/or biometric verification. The consent, for example, may only be given to individual biographic data elements. In another implementation, the consent may restrict the type of biometric data being taken by the service provider. The consent may further specify an expiration time of the consent. As such, the identity provider would only perform validation of biographic and/or biometric data if taken and sent by the service provider to the identity provider before the expiration time. A protocol may be pre-established for the user consent such that the consent can be properly formulated by the mobile identity wallet 606 and correctly interpreted and implemented by the service provider 610.

This second verification process 901 of FIG. 9 does not directly involve the permissioned DDSL. Rather, the verification is performed off-DDSL by the identity server. Specifically and as described above, the identity provider server 612 receives the biographic and/or biometric data captured by the service provider station 634, and compare the biographic and/or biometric data with the information stored in the identity provider server under the DUIS corresponding to the token contained in the user identity index data element obtained from the permissioned DDSL. A match would verify that the mobile identity wallet belongs to the user holding it. The verification outcome may be further communicated from the identity provider server 612 to the service provider off-DDSL (942).

After enrollment of user identity with the identity provider, it may be renewed periodically, similar to ePassport renewals. Renewals of identity may be necessitated by gradual change of biometric characteristics of a person as they age. Such changes may be more pronounced at a younger age. Accordingly, the frequency of identity renewals may be higher for younger users. For example, identity may be renewed every 10 years for adults and every 5 years for children. Further, identity of a user may need to be replaced in the event that the mobile identity wallet belonging to the user is lost or stolen. The renewal process may involve an identity update with the identity provider and a corresponding update of the identity index data element in the permissioned DDSL.

Figure 10:
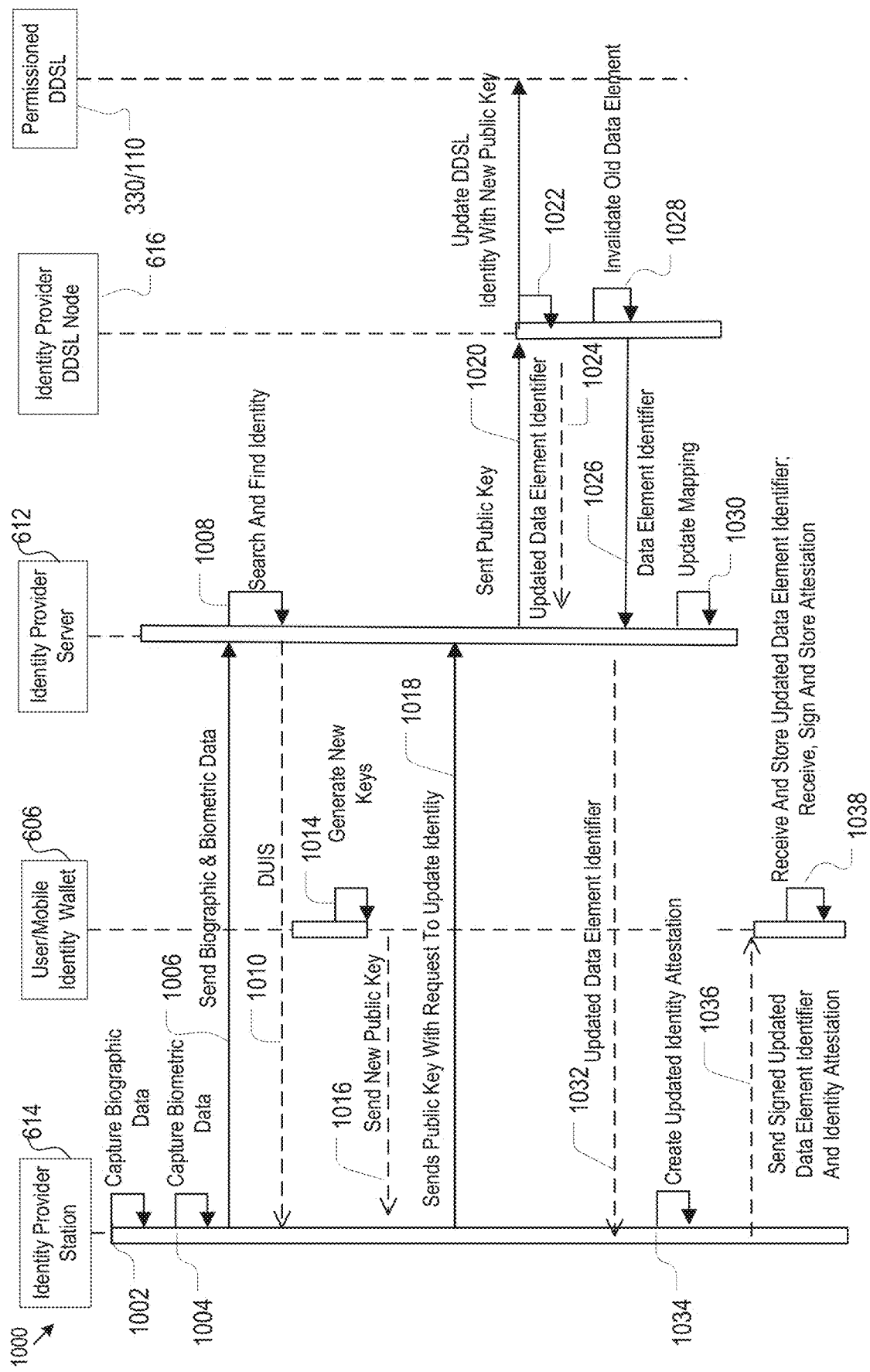
FIG. 10 shows message flow between data platforms for renewing digital identity and updating a distributed data storage layer identity index.

FIG. 10 shows an exemplary logic flow 1000 for identity renewal that a biometric identity system running on a DDSL may implement. In particular, the user may approach the identity provider station 614, either with an existing mobile identity wallet 606 for identity renewal or with a new mobile identity wallet 606 for identity replacement. The identity provider station first captures biographic and/or biometric data from the user (1002 and 1004). The biographic and/or biometric data are then sent to the identity provider server 612 (1006). The identity provider server 612 then searches its identity data store and finds an identity having matching biographic and/or biometric information (1008). The DUIS for the matching identity is then returned to the identity provider station 614 (1010). The user then generates a new pair of public and private keys on the mobile identity wallet 606 (1014). The new public key is sent to the identity provider station 614 via, for example, QR code (1016). The identity provider station 614 then sends the new public key for the user with a request to update identity of the user to the identity provider server 612 (1018).

Continuing with FIG. 10, the identity provider server 612 further sends the new user public key to the identity provider DDSL node 616 (1020) for updating the DDSL identity for the user (1022). The updating of the DDSL involves writing a new identity index data element containing the new user public key and the tokenized DUIS. It is preferable that the DUIS for the user does not change and remains unique for this particular user. The token for the DUIS may remain the same as the old token. Alternatively, a new token may be generated from the DUIS for the user. The new identity index data element is signed using the private key of the identity provider and inserted into the permission DDSL 330/110 with an updated data element identifier. A second new data element may also be written to the permission DDSL (1028). This second new data element may be a record showing that the old identity data element with the old data element identifier has been updated and has become invalid, and that the new identity of the user is recorded in the identity index data element having the updated data element identifier. This second new data element may be inserted into the permissioned DDSL 330/110 with its own data element identifier. Both the updated data element identifier for the new identity index data element and the data element identifier for the second new data element for invalidation of the old identity are returned to the identity provider server 612 (1024 and 1026). The identity provider server 612 may then update mapping between the DUIS, the data element identifiers, and the tokens (both the old one and new one if regenerated from the DUIS during identity update) for the user (1030).

Still continuing with FIG. 10, the identity provider server 612 further forwards the updated data element identifier for the new identity index data element in the permissioned DDSL (the data element recording the new user public key) to the identity provider station 614 (1032). In response, the identity provider station 614 generates an updated identity attestation for the user (1034), signs it, and sends it together with the updated data element identifier signed by the identity provider to the mobile identity wallet 606 of the user (1036). The mobile identity wallet 606 receives and securely stores the updated data element identifier and the updated attestation (1038). The mobile identity wallet 606 signs the attestation before storing it. As such, the attestation may be doubly signed (by both the identity provider and the user). Alternatively, the identity attestation may be stored by the mobile identity wallet 606 unsigned by the user and it may be signed when being provided to a service provider for identity verification. The updated data element identifier for the new identity index data element may be signed by the identity provider using its private key. In one alternative implementation, the updated data element identifier may not need to be signed by the identity provider using its private key. In that implementation, the mobile identity wallet may store the updated data element identifier without any digital signature.

In some situations, the user may desire to update biographic and/or biometric data with an identity provider and update the signed biographic and or biometric data in the mobile identity wallet. Such update may be achieved using various components discussed above in FIGS. 8-10. For example, the user may approach an identity provider station, and after authentication by the identity provider, via the attestation authentication procedure discussed above and by capturing user biographic and/or biometric data at the provider station and compare it to the recorded biographic and/or biometric data (collected when the user registers), the user may be allowed to provide updated biographic and/or biometric data to the identity provider. For example, the user may update biographic information by attestation authentication procedure and by biometric authentication procedure (e.g., the identity provider station captures biometric information and compare the captured biometric information to previously stored biometric information). Similarly, the user may update biometric information (e.g., when previously captured biometric information was poor or user biometric characteristics have partially changed) by the attestation authentication procedure and biometric authentication procedure. In this latter scenario, authentication of biometric information may still be performed even when the previously captured biometric information was poor, e.g., by taking multiple biometric samples and/or by using more sophisticated biometric comparison and authentication algorithms. If the user's biometric characteristic has partially changed, biometric authentication may still be performed fully or partially based on the biometric characteristics that has not changed. Once authenticated, the identity providers may then update and store the updated user biographic and/or biometric data. The provider may further sign the updated biographic and/or biometric data and send the signed updated biographic and/or biometric data to the mobile identity wallet of the user. As another example, the user may update biographic and/or biometric data at a service provider station. In one implementation, the user may present identity data in the mobile identity wallet to the service provider. The service provider may validate the user identity following FIG. 9, e.g., including the identity attestation validation and/or validation of the biographic and/or biometric information. After the identity validation, the user may be allowed to provide updated biographic and/or biometric data to the service provider. The service provider may send the updated biographic and/or biometric data to the identity provider. The identity provider may update and store the update user biographic and/or biometric data and send a signed version back to the user mobile identity wallet via the service provider.

Figure 11:
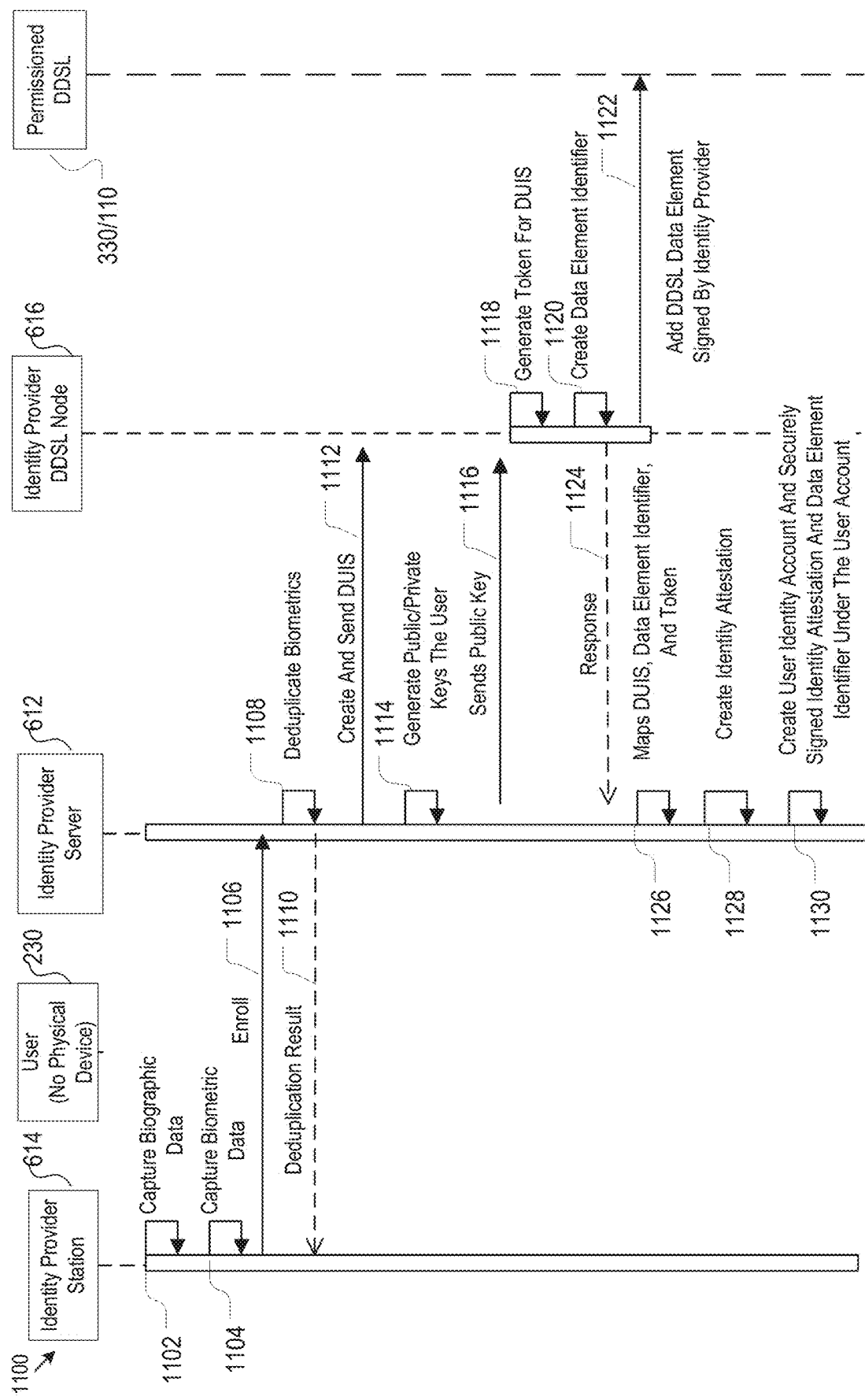
FIG. 11 shows message flow between data platforms for generating digital identity and creating a distributed data storage layer identity index without any personal identity device.
Figure 12:
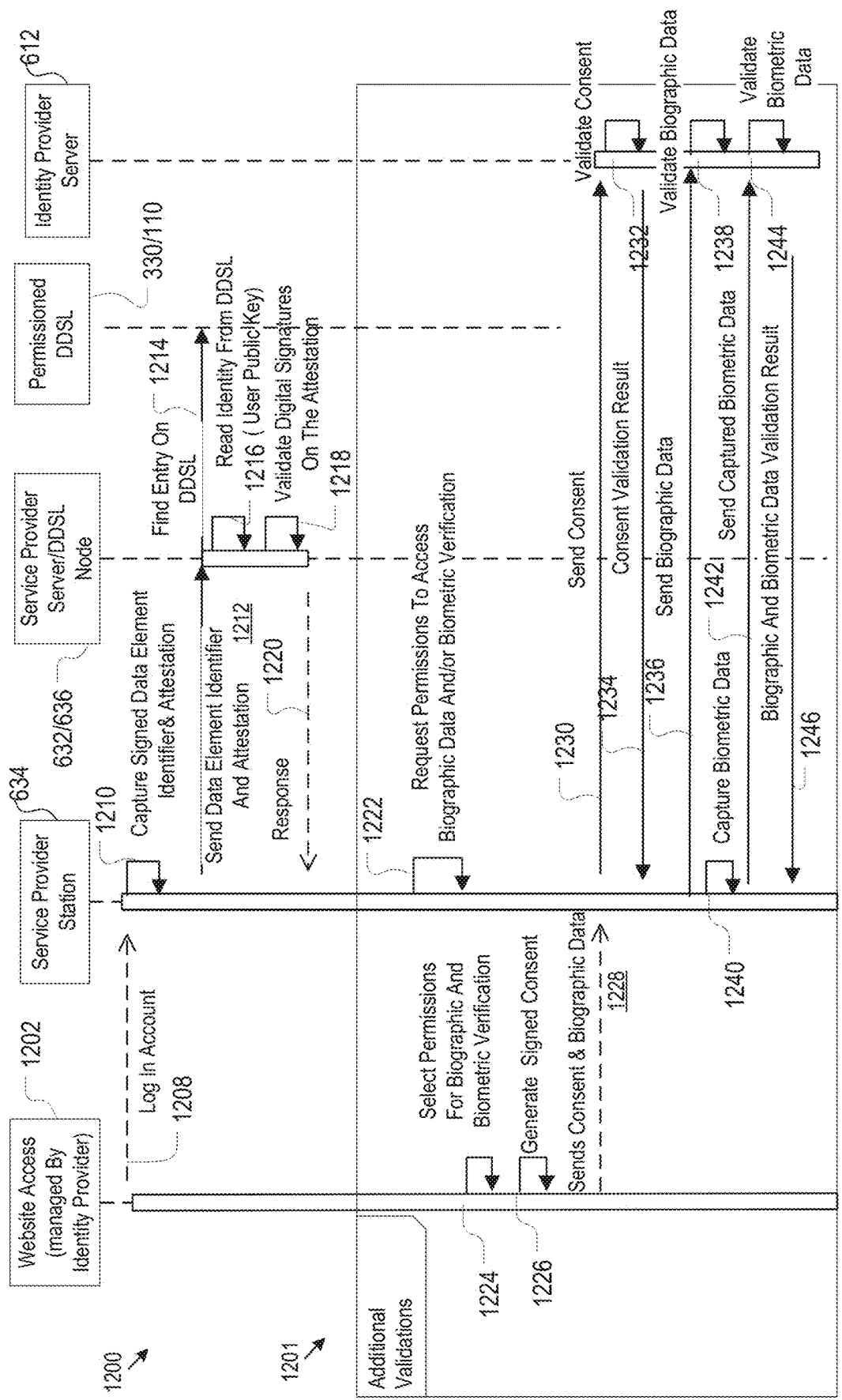
FIG. 12 shows message flow between data platforms for requesting identity authentication and biometric identity verification without any personal identity device.

Turning to FIG. 11, in some implementation, identity of a user may be established and verified without a mobile identity wallet. The identity attestation and data element identifier for the identity index data element in the permissioned DDSL may only need to be maintained by the identity provider. The identity provider may then provide a web portal for the user to log into an identity account maintained by the identity provider for the user when identity verification of the user by a service provider is required. The web portal for the user may be accessed on a web browser running on any data platform. For example, a web browser may be provided by a service provider station. The web browser communicates with web servers of the service provider for accessing the user identity account. In one alternative implementation, a dedicated application on the service provider station rather than a web browser may be used for accessing the identity account for the user. FIGS. 11 and 12 illustrate exemplary implementations for creating and access user identity without a mobile identity wallet.

FIG. 11 shows an exemplary logic flow 1100 for establishing a user identity with the identity provider without any mobile device from the user. Specifically, biographic and/or biometric data of the user are first captured by the identity provider station 614 (1102 and 1104). The identity provider station communicates with the identity provider server 612 for requesting identity enrollment of the user and sends the captured biographic and/or biometric information (1106). The identity provider server 612 performs biometric deduplication upon receiving the enrollment request and biographic and/or biometric information (1108). The identity provider server 512 then sends the deduplication results to the identity provider station 614 (1110). In the meanwhile, identity provider server 612 proceeds to create a DUIS for the user and sends the DUIS to the identity provider DDSL node 616 (1112). The identity provider server 612 further generates a pair of private/public keys for the user (1114), and sends the generated public key to the identity provider DDSL node 616 (1116). The private key of the user may be managed in an HSM.

Continuing with FIG. 11, the identity provider DDSL node 616 receives the DUIS and the user public key, and then generates a token from the received DUIS (1118). In an alternative implementation, the token may be generated by the identity server 612 and then sent to the identity provider DDSL node. The identity provider DDSL node 616 further generates a data element identifier for an identity index data element to be inserted into the permissioned DDSL 330/110 (1120). The identity index data element may contain the token for the DUIP and the public key of the user. The identity index data element is signed using the private key of the identity provider and inserted into the permissioned DDSL 330/110 (1122).

Upon creating the data element identifier for the identity index data element, a response is sent to the identity provider server 612 containing the data element identifier and token for the DUIS (1124). The identity provider 612 then maps the received token and data element identifier to the corresponding DUIS of the user (1126). The identity provider server 612 then proceeds to create an identity attestation (1128). The identity provider server 612 further creates a secure user account accessible by the user using, e.g., a set of username and password; signs the data element identifier using the private key of the identity provider; doubly signs the identity attestation (using private keys of both the service provider and the user); and securely stores the signed identity attestation and data element identifier under the secure user identity account (1130). In one alternative implementation, the data element identifier may not need to be signed by the identity provider using its private key. In that implementation, the identity provider server 612 may store the data element identifier without any digital signature.

FIG. 12 illustrates an exemplary logic flow for a user to obtain service via the user account maintained by the identity provider without a mobile identity wallet. Similar to FIG. 9, the first portion of FIG. 12 indicated by 1200 illustrates a logic flow for authentication by the service provider that the digital identity (e.g., the attestation) was issued and attested to by the identity provider. The second portion of FIG. 12 indicated by 1201 illustrates a logic flow for further verification of the biometric and/or biographic information of the user. As previously discussed, this second portion helps verify that the identity attestation pertains to the user.

For the first portion of authentication 1200, the user may approach a service provider station 634 for obtaining service. The user may log into the user identity account maintained by the identity provider to provide the signed attestation and the data element identifier for the identity index data element in the permissioned DDSL for the user (1208 and 1210). The user may use, e.g., a web browser provided by the service provider station 634 to log into its identity account.

The service provider station 634 receives the doubly signed identity attestation and the signed or unsigned data element identifier and then sends the data element identifier and identity attestation to the service provider server and DDSL node 632/636 for authentication (1212). If the data element identifier was not signed by the identity provider, the service provider server and DDSL node 632/636 may directly use the unsigned data element identifier to look up the corresponding identity index data element in the permission DDSL (1214). In the event that the data element identifier was signed by the identity provider, the service provider server and DDSL node 632/636 may first use the public key of the identity provider to decrypt the signed data element identifier and then use the decrypted data element identifier to look up the corresponding identity index data element in the permission DDSL (1214). The service provider server and DDSL node 632/636 may then use the public key of the identity provider to decrypt the corresponding identity data element located and identified from the permission DDSL to obtain the public key of the user (1216). For authentication of the attestation (1218), the public key of the user may be used to decrypt the attestation signed by the user to obtain attestation signed by the identity provider. The attestation signed by the identity provider may then be further decrypted by the service provider using the public key of the identity provider. As such, the identity attestation may be read and analyzed by the service provider to complete the authentication 1218 that the content of the identity attestation was indeed signed by the identity provider and signed by the user. The authentication result is then sent to the service provider station 634 (1220).

The logic flow 1200 above authenticates that the identity attestation contains a valid digital signature by the identity provider and the user. If the service provider desires to further verify that the identity attestation belongs to the user, logic flow shown in 1201 of FIG. 12 may be performed. Specifically, the service provider station 634 may request permission for further identity verification (1222). Upon such a request, the user may give permission via the user identity account to the service provider station to verify biographic and/or biometric data (1224). The permission may be provided in the form a consent and the consent may be signed by the user using the private key of the user via the identity account (1226). The signed consent and biographic data may be sent to the service provider station 634 (1228) and further sent to the identity provider server 612 (1230). The identity provider server 612 validates the user consent (1232) by checking the digital signature on the consent by the user and confirm validity of the consent (1234). Upon validity confirmation of the consent, the service provider station 634 may send user biographic data to the identity provider server for verification (1236). The verification process by the identity provider server 612 may involve comparing received biographic data with the biographic data stored in the identity provider server for the user (1238). Further, the service provider station 634 may physically capture the biometric information of the user (1240) and then send the captured biometric data to the identity provider server 612 (1242). The identity provider server 612 then validates the biometric information by comparing the received biometric information with the biometric information stored in the identity provider server for the user (1244). The validation result may then be sent to the service provider server 632 and station 634 (1246).

Again, the user consent generated at step 1226 may contain restriction for the biographic and/or biometric verification. The consent, for example, may only be given to biographic data. In another implementation, the consent may restrict the type of biometric data being taken by the service provider. The consent may further specify an expiration time of the consent. As such, the identity provider would only perform validation of biographic and/or biometric data if taken and sent by the service provider to the identity provider before the expiration time.

This second verification process 1201 of FIG. 12 does not involve the permissioned DDSL. Rather, the verification is performed off-DDSL by the identity server. Specifically and as described above, the identity provider server 612 receives the biographic and/or biometric data captured by the service provider station 634, and compare the biographic and/or biometric data with the information stored in the identity provider server under the DUIS corresponding to the token obtained from the permissioned DDSL. A match would verify that the identity attestation belongs to the user. The verification outcome may be further communicated from the identity provider server 612 to the service provider off-DDSL (1246).

Figure 13:
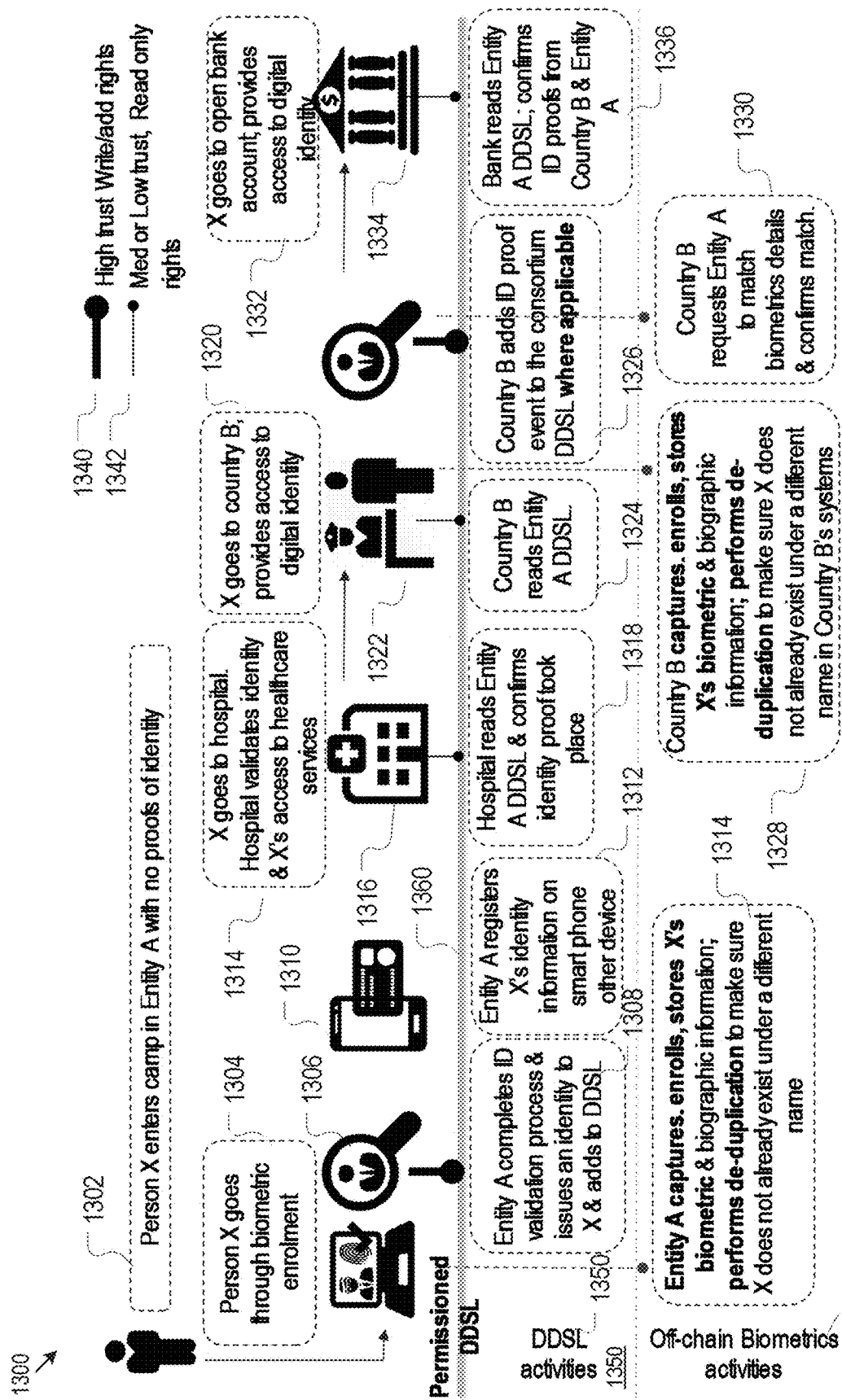
FIG. 13 shows an example application of a global biometric identification system.

FIG. 13 further illustrates an example application 1300 of the global network architecture for a biometric identification described above by following an individual X 1302 through various identity and service providers. Interactions represented by symbol 1340 indicate writes to the permissioned DDSL 1360 by high trust entities. Interactions represented by symbol 1342 indicate reads from the permissioned DDSL 1360 by medium or low trust entities. Activities depicted in row 1350 pertain to activities related to the permissioned DDSL. Activities depicted in row 1352 pertain to off-DDSL activities.

Specifically, individual X may go through a biometric enrollment with an entity A 1306 (1304). Entity A issues an identity to individual X and insert an identity index data element into the permissioned DDSL (1308). The data element functions as an identity index for the purpose of identity authentication as described in the implementations above. The identity index data element does not contain actual biographic or biometric information. Rather, these data are secured maintained by entity A off-DDSL (1314). Entity A further perform de-duplication of biographic and/or biometric information off-DDSL to avoid multiple registration for the same individual X (1314). The identity of individual X is registered on smart phone or other mobile device 1310 of individual X (1312). Once registered, individual X may visit a certified service provider, such as hospital 1316 to access healthcare services that require identity verification (1314). Hospital 1316 may read the identity index data element for individual X from the permissioned DDSL to authenticate the identity carried in the mobile phone of individual X (1318). Healthcare services may be provided accordingly after authentication. Hospital 1316 may not require physical verification of biometric information.

Continuing with FIG. 13, individual X may travel to enter country B 1322, which require both identity authentication and biometric verification (1320). Country B may read the identity index data element of individual X from the permissioned DDSL for identity authentication (1324). Country B may also be an identity provider and thus may capture biographic and/or biometric information of individual X, perform deduplication, and store the de-duplicated information off-DDSL (1328). Country B may be of high level of trust and may thus write a new identity index data element into the permissioned DDSL representing identity registration of individual X in country B, or concerning the entry of individual X into country B (1326). Country B may further update the mobile phone of individual X concerning this identity registration in country B. Country B may perform biometric verification by requesting entity A to match the biometric information captured by country B and the biometric information stored with entity A when individual X's identity was registered by entity A (1330). Individual X may further go to open a bank account with bank 1334 using its digital identity (1332). The bank 1334 may read the permissioned DDSL for identity index data elements written by entity A and country B for identity authentication before proceeding to open a bank account for individual X (1336).

The global network architecture and system for biometric identification described above and implemented by the system circuitry 404 of FIG. 4 of various servers, stations and DDSL nodes improve the functioning of the underlying hardware itself, by implementing a non-traditional and per-missioned DDSL for storing unalterable identity indexes in combination with off-DDSL secure storage of biometric information to achieve portable electronic identity. Such a system uses DDSL to protect the authenticity of the identity registration and controls access to biometric information at the same time. As a few examples of improved functionality described in FIGS. 5-13, the system circuitry 404 provides: biometric data capture, biographic data capture, secure biometric and/or biographic data storage, obtaining DUIS, token generation from DUIS, de-duplication of individual identities, creating encryption keys for digital signatures, issuing use consent requests and receiving consent authorization messages, biometric data retrieval from the data storage layer, biometric data verification, permissioned DDSL, and an interplay between DDSL functionalities and off-DDSL functionalities. These functions may be distributed over multiple physically distinct and connected data platforms, and need not all be present within a single system. The distributed data platforms are arranged and interact in a specific way to function as a global biometric identity registration, authentication, and verification system in the context of providing and receiving a range of services requiring various levels of identity verification.

The system provides technical solutions to the problems associated with physical identity. Such problems include the dedicated infrastructure needed to enroll and vet residents and provision identity documents; that such an infrastructure and identity documents are costly; that possession of physical documents may not require demonstration of a link between an individual and the documents; that they can be falsified, altered or tampered with, as well as lost or stolen; and the potential for human error in creation of the documents and transactions using the documents. The biometric processing system described above, for example, links individuals to a digital identity as shown in FIGS. 5 and 13. Note that the data storage layer based on a permissioned DDSL, e.g., a consortium-based and permissioned distributed ledger, allows individuals to control their accredited identity index, making it unalterable and available to certified entities globally. In some of the implementations above (e.g., FIGS. 11 and 12), a need for any physical identity or digital identity device is removed. Moving physical or portable digital identity device into the network provides improved mobility and represents a technical solution to the problems above.

The system disclosed above has many data access advantages, e.g., the system:
  allows individuals to manage who has access to their data, down to the specific fields and time allowed to access the data;

allows the individual to establish relationship with trusted parties via explicit consent;

provides the flexibility to extend the scope of the solution to allow an individual to share data in circumstances where participants cannot share data with another party due to national and regulatory jurisdiction; and provides easier compliance with data protection regulations (such as General Data Protection Regulation of European Union) and other similar regulations.

Other additional benefits and characteristics of the system disclosed above include that the system:

links digital identity to a real person; Reduce fraud;

increases non-repudiation through the use of biometric de-duplication;

enables portable identity with no need for documents;

reduces the number of duplicates of identities in system;

returns ownership of data back to user;

stores proofs of unique identity on DDSL and can be accessed by others on the chain;

removes the need to repeat de-duplication or conduct biometric identity proofs if capture/enrolment party is high assurance/trust.

The methods, devices, architectures, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. For instance, any of the components and functionality in the architecture may be hosted in virtual machines managed by a cloud services provider. That is, while some implementations may be completely localized within a given enterprise, other implementations are completely migrated into the cloud, or are hybrid implementations with mixed local and cloud implementation. Regarding querying devices, the smartphones applications and desktop computers noted above are just particular examples, and other querying devices may be used, including hands-free systems in vehicles, digital personal assistants in smartphones or desktop PCs, hands-free control systems for the home, and many other types of devices.

What is claimed is:

1. A system comprising:

a data storage layer comprising linked data blocks containing data elements;

a data repository separate from the data storage layer with more restrictive access than the data storage layer;

system circuitry in communication with the data storage layer and the data repository, the system circuitry configured to:

capture biographic and/or biometric information of a user;

store the captured biographic and/or biometric information of the user in the data repository;

obtain a public key for the user;

create a digital unique identification sequence for the user seeded from the biographic and/or biometric information;

generate a token for the user based on the digital unique identification sequence;

generate an identity index for the user based on the digital unique identification sequence, wherein the identity index comprises the public key for the user and the token for the user;

digitally sign the identity index using a private key of the system and insert the signed identity index into the linked data blocks of the data storage layer;

obtain a data element identifier for the inserted identity index in the linked data blocks of the data storage layer;

generate a digital identity attestation of the identity index for the user;

digitally sign the digital identity attestation using the private key of the system;

generate a mapping between the digital unique identification sequence, the data element identifier for the inserted identity index for the user, and the biographic and/or biometric information of the user stored in the data repository;

store the mapping in the data repository while keeping the biographic and/or biometric information of a user off the linked data blocks of the data storage layer;

provide a first identity verification service based on the signed identity index stored in the linked data blocks of the data storage layer; and provide a second identity verification service requiring higher security than the first identity verification service based on the signed identity index in stored in the linked data blocks of the data storage layer and the biographic and/or biometric information stored off the linked data blocks and in the data repository with more restrictive access.

2. The system of claim 1, where the digital unique identification sequence is responsive to the captured biographic and/or biometric information.

3. The system of claim 1, where the public key for the user is generated by a mobile device of the user and communicated to the system circuitry from the mobile device.

4. The system of claim 3, where the system circuitry is further configured to securely communicate the digital identity attestation signed by the system circuitry and the data element identifier to the mobile device of the user.

5. The system of claim 1, where the public key for the user is generated by system circuitry and where the system circuitry is further configured to:

generate a private key for the user paired with the public key for the user;

sign, using the private key of the user, the digital identity attestation signed with the private key of the system; and securely store the digital identity attestation signed by both the private key of the user and the private key of the system in the data repository.

6. The system of claim 5, wherein system circuitry, upon request by the user, is further configured to communicate the digital identity attestation signed using both the private key of the user and the private key of the system and the data element identifier to a service provider for an identity verification by the service provider.

7. The system of claim 1, where the system circuitry is further configured to:

receive a consent containing digital signature by the user for a service provider to verify biographic and/or biometric information of the user;

validate the consent by verifying the digital signature of the user;

receive a set of biographic and/or biometric information captured and sent by the service provider; and upon validation of the digital signature of the user contained in the consent:

identify the biographic and/or biometric information stored in the data repository for the user;

determine a result whether the biographic and/or biometric information stored in the data repository for the user matches the set of biographic and/or biometric information received from the service provider; and communicate the result to the service provider.

8. The system of claim 1, wherein the system circuitry is further configured to:

provide identity account for the user;

accept a request for access the identity account from the user; and communicate the data element identifier and the signed attestation to a service provider upon an instruction from the user when accessing the identity account.

9. A method comprising:

in system circuitry in communication with a data storage layer comprising linked data blocks containing data elements and a data repository separate from the data storage layer with more restrictive access than the data storage layer:

capturing biographic and/or biometric information of a user;

storing the captured biographic and/or biometric information of the user in the data repository;

obtaining a public key for the user;

creating a digital unique identification sequence for the user seeded from the biographic and/or biometric information;

generating a token for the user based on the digital unique identification sequence;

generating an identity index for the user based on the digital unique identification sequence, wherein the identity index comprises the public key for the user and the token for the user;

digitally signing the identity index using a private key of the system circuitry and insert the signed identity index into the linked data blocks of the data storage layer;

obtaining a data element identifier for the inserted identity index in the linked data blocks of the data storage layer;

generating a digital identity attestation of the identity index for the user;

digitally signing the digital identity attestation using the private key of the system;

generating a mapping between the digital unique identification sequence, the data element identifier for the inserted identity index for the user, and the biographic and/or biometric information of the user stored in the data repository;

storing the mapping in the data repository while keeping the biographic and/or biometric information of a user off the linked data blocks of the data storage layer;

providing a first identity verification service based on the signed identity index stored in the linked data blocks of the data storage layer; and providing a second identity verification service requiring higher security than the first identity verification service based on the signed identity index in stored in the linked data blocks of the data storage layer and the biographic and/or biometric information stored off the linked data blocks and in the data repository with more restrictive access.

10. The method of claim 9, where the digital unique identification sequence is responsive to the captured biographic and/or biometric information.

11. The method of claim 9, where the public key for the user is generated by a mobile device of the user and communicated to the system circuitry from the mobile device.

12. The method of claim 11, further comprising securely communicating the digital identity attestation signed by the system circuitry and the data element identifier to the mobile device of the user.

13. The method of claim 9, where the public key for the user is generated by system circuitry and where the method further comprises:

generating a private key for the user paired with the public key for the user;

signing, using the private key of the user, the digital identity attestation signed with the private key of the system; and securely storing the digital identity attestation signed using both the private key of the user and the private key of the system in the data repository.

14. The method of claim 13, further comprising communicating the digital identity attestation signed using both the private key of the user and the private key of the system and the data element identifier to a service provider for an identity verification by the service provider upon a user request.

15. The method of claim 9, further comprising:
receiving a consent containing digital signature by the user for a service provider to verify biographic and/or biometric information of the user;
validating the consent by verifying the digital signature of the user;
receiving a set of biographic and/or biometric information captured and sent by the service provider; and
upon validating the digital signature of the user contained in the consent:
identifying the biographic and/or biometric information stored in the data repository for the user;
determining a result whether the biographic and/or biometric information stored in the data repository for the user matches the set of biographic and/or biometric information received from the service provider; and
communicating the result to the service provider.

16. The method of claim 9, further comprising:
providing identity account for the user;
accepting a request for access the identity account from the user; and
communicating the data element identifier and the signed attestation to a service provider upon an instruction from the user when accessing the identity account.

* * * * *